(12) United States Patent
Park et al.

(10) Patent No.: US 12,449,853 B2
(45) Date of Patent: Oct. 21, 2025

(54) ELECTRONIC DEVICE WITH OPENING STRUCTURE

(71) Applicant: Samsung Electronics Co., Ltd., Gyeonggi-do (KR)

(72) Inventors: Sinyoung Park, Gyeonggi-do (KR); Doosun Yoon, Gyeonggi-do (KR); Inyoul Baek, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 17/840,854

(22) Filed: Jun. 15, 2022

(65) Prior Publication Data

US 2022/0337684 A1     Oct. 20, 2022

Related U.S. Application Data

(63) Continuation of application No. PCT/KR2022/002085, filed on Feb. 11, 2022.

(30) Foreign Application Priority Data

Apr. 20, 2021   (KR) .................. 10-2021-0050893

(51) Int. Cl.
*G06F 1/16*      (2006.01)
*H04M 1/02*      (2006.01)

(52) U.S. Cl.
CPC .......... *G06F 1/1652* (2013.01); *G06F 1/1681* (2013.01); *H04M 1/0268* (2013.01); *H04M 2201/38* (2013.01)

(58) Field of Classification Search
CPC .... G06F 1/1652; G06F 1/1641; G06F 1/1681; G06F 1/1616; G06F 1/1637; G06F 1/1656; G06F 1/1601; G06F 1/1643
See application file for complete search history.

(56) References Cited

U.S. PATENT DOCUMENTS 3,927,767 A * 12/1975 Sato ..................... B65D 81/022
                                                              206/214
10,198,040 B2    2/2019 Zhang et al.
(Continued)

FOREIGN PATENT DOCUMENTS

CN           112164318 A      1/2021
KR     10-2008-0093340 A     10/2008
(Continued)

OTHER PUBLICATIONS

Extended European Search Report dated Jun. 24, 2024.

*Primary Examiner* — Abhishek M Rathod
(74) *Attorney, Agent, or Firm* — Cha & Reiter, LLC

(57) ABSTRACT

In an embodiment, an electronic device may include a housing including a first housing structure and a second housing structure that are rotatably connected to each other by a hinge structure; a flexible display including a first area, a second area, and a third area; and a first plate disposed between the housing and the flexible display. The first plate may include a first planar portion facing the first area, a second planar portion facing the second area, and a bendable portion. The first plate may further include at least one opening structure formed at a designated position on the outer sides S of at least one of the first planar portion and the second planar portion to be at least partially stretchable or compressible.

18 Claims, 29 Drawing Sheets

(56) References Cited

U.S. PATENT DOCUMENTS

| | | | |
|---|---|---|---|
| 10,368,452 B2 * | 7/2019 | Yun | G09F 9/301 |
| 10,727,435 B2 | 7/2020 | Kim et al. | |
| 10,775,852 B2 | 9/2020 | Kim et al. | |
| 11,487,327 B2 * | 11/2022 | Horiuchi | G06F 1/1641 |
| 11,656,655 B2 * | 5/2023 | Shin | G06F 1/1643 |
| | | | 361/679.27 |
| 11,662,780 B2 * | 5/2023 | Park | G06F 1/1616 |
| | | | 361/679.01 |
| 11,823,595 B2 * | 11/2023 | Wang | G06F 1/1641 |
| 11,841,746 B2 * | 12/2023 | Kang | G09F 9/30 |
| 12,011,907 B2 * | 6/2024 | Park | G06F 1/1656 |
| 2018/0190936 A1 * | 7/2018 | Lee | B32B 3/30 |
| 2019/0036068 A1 * | 1/2019 | Kim | G06F 1/1601 |
| 2019/0132987 A1 * | 5/2019 | Koo | H05K 7/18 |
| 2020/0052239 A1 * | 2/2020 | Kim | H10K 50/844 |
| 2020/0183450 A1 | 6/2020 | Jang et al. | |
| 2020/0209925 A1 | 7/2020 | Paek et al. | |
| 2020/0319672 A1 * | 10/2020 | Kim | G06F 1/1641 |
| 2020/0389986 A1 | 12/2020 | Tsuchihashi et al. | |
| 2021/0286407 A1 * | 9/2021 | Kim | H04M 1/0268 |

FOREIGN PATENT DOCUMENTS

| | | |
|---|---|---|
| KR | 10-2018-0079091 A | 7/2018 |
| KR | 10-2019-0080740 A | 7/2019 |
| KR | 10-2020-0052621 A | 5/2020 |
| KR | 10-2020-0108754 A | 9/2020 |
| KR | 10-2021-0019803 A | 2/2021 |

\* cited by examiner

ELECTRONIC DEVICE WITH OPENING STRUCTURE

CROSS-REFERENCE TO RELATED APPLICATIONS

This application is a continuation of International Application No. PCT/KR2022/002085 designating the United States, filed on Feb. 11, 2022, in the Korean Intellectual Property Receiving Office and claiming priority to Korean Patent Application No. 10-2021-0050893, filed on Apr. 20, 2021, in the Korean Intellectual Property Office, the disclosures of which are incorporated by reference herein in their entireties.

BACKGROUND

1. Field

One or more embodiments of the following disclosure generally relate to an electronic device with an opening structure.

2. Description of Related Art

Recent developments in the electronic communication industry have brought about a proliferation of portable electronic devices. Such portable electronic devices may include, for example, various portable and personal electronic devices, such as personal digital assistants (PDAs), smartphones, tablet personal computers (PCs), MP3 players, laptop PCs, digital cameras, and wearable devices, in addition to mobile communication terminals for communication.

Various form factors of these electronic devices have been developed according to users' needs. For example, an electronic device may be deformable or foldable such that it is easy to carry but at the same time the electronic device can include a large display. For example, a foldable electronic device that can be unfolded to show an area (e.g., display area) of the electronic device may be provided.

SUMMARY

A foldable electronic device may include a hinge structure between paired housings to implement folding and unfolding operations, and a plate having a lattice structure disposed at the center of the device may be attached to the display for durability as well as to prevent foreign substances from being introduced into the display. As described above, in a folding structure that includes a left housing, a right housing, and a hinge between the left housing and the right housing, dimensional tolerance and assembly tolerance may allow for movement between the left housing and the right housing. Such a movement is so slight that the user generally cannot feel the movement, however, in a situation where a great external force is applied, such as during a drop impact, magnitude of the movement may instantaneously increase or increase over a very short duration (e.g. in the order of nanoseconds). If a large movement occurs between the left housing and the right housing, a shear movement may also occur in the display assembled across the left housing and the right housing. In this case, as stress is concentrated on the central grid structure of the plate attached to the display, defects, such as disconnection of the light-emitting diode (LED) circuit in the display, or occurrence of bright spots or shrinkage, may occur.

In an example embodiment, the electronic device 300 may include: the housing 410 including the first housing structure 411 and the second housing structure 412 that are rotatably connected to each other by the hinge structure 413; the flexible display 530 including the first area 531 facing the first housing structure 411, the second area 532 facing the second housing structure 412, and the third area 533 connecting the first area 531 and the second area 532; and the first plate 540 disposed between the housing 410 and the flexible display 530 and configured to support the flexible display 530. The first plate 540 may include the first planar portion 541 facing the first area 531, the second planar portion 542 facing the second area 532, and the bendable portion 543 that connects the first planar portion 541 and the second planar portion 542. The first plate 540 may further include at least one opening structure 544 formed at a designated position on the outer sides S of at least one of the first planar portion 541 and the second planar portion 542 to be at least partially stretchable or compressible when an external impact is incident upon it.

In an example embodiment, the electronic device 300 may include: the flexible display 530 including the first area 531, the second area 532, and the third area 533 connecting the first area 531 and the second area 532; and the first plate 540 disposed on the rear surface of the flexible display 530 and configured to support the flexible display 530. The first plate 540 may include the first planar portion 541 facing the first area 531, the second planar portion 542 facing the second area 532, and the bendable portion 543 that connects the first planar portion 541 and the second planar portion 542. The first plate 540 may further include at least one opening structure 544 formed at a designated position on the outer sides S of at least one of the first planar portion 541 and the second planar portion 542 to be at least partially stretchable or compressible when an external impact is incident upon it.

In an example embodiment, the electronic device 300 may include: the housing 410 including the first housing structure 411 and the second housing structure 412 that are rotatably connected to each other by the hinge structure 413; the flexible display 530 including the first area 531 facing the first housing structure 411, the second area 532 facing the second housing structure 412, and the third area 533 connecting the first area 531 and the second area 532; and the first plate 540 disposed between the housing 410 and the flexible display 530 and configured to support the flexible display 530. The first plate 540 may include the first planar portion 541 facing the first area 531, the second planar portion 542 facing the second area 532, and the bendable portion 543 that connects the first planar portion 541 and the second planar portion 542. The first plate 540 may further include at least one opening structure 544 formed at a designated position on the outer sides S of at least one of the first planar portion 541 and the second planar portion 542 to be at least partially stretchable or compressible when an external impact is incident upon it. The opening structure 544 may include the first opening structure 5441 formed on at least one of the parallel sides PS1 and PS2 that are sides parallel to the folding axis A of the hinge structure 413 in the outer sides S of the first planar portion 541 and the second planar portion 542, and include the second opening structure 5442 formed on at least one of the vertical sides VS1, VS2, VS3, and VS4 that are sides perpendicular to the folding axis A in the outer sides S of the first planar portion 541 and the second planar portion 542. The first opening structure 5441 may be formed at points where the parallel side PS1 or PS2 meets the imaginary extension line L1 or L2 extending in a direction perpendicular to the folding axis A from the inner end portion of the hinge structure 413, and the second opening structure 5442 may be formed at points at which the vertical side VS1, VS2, VS3, or VS4 is divided into two parts.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
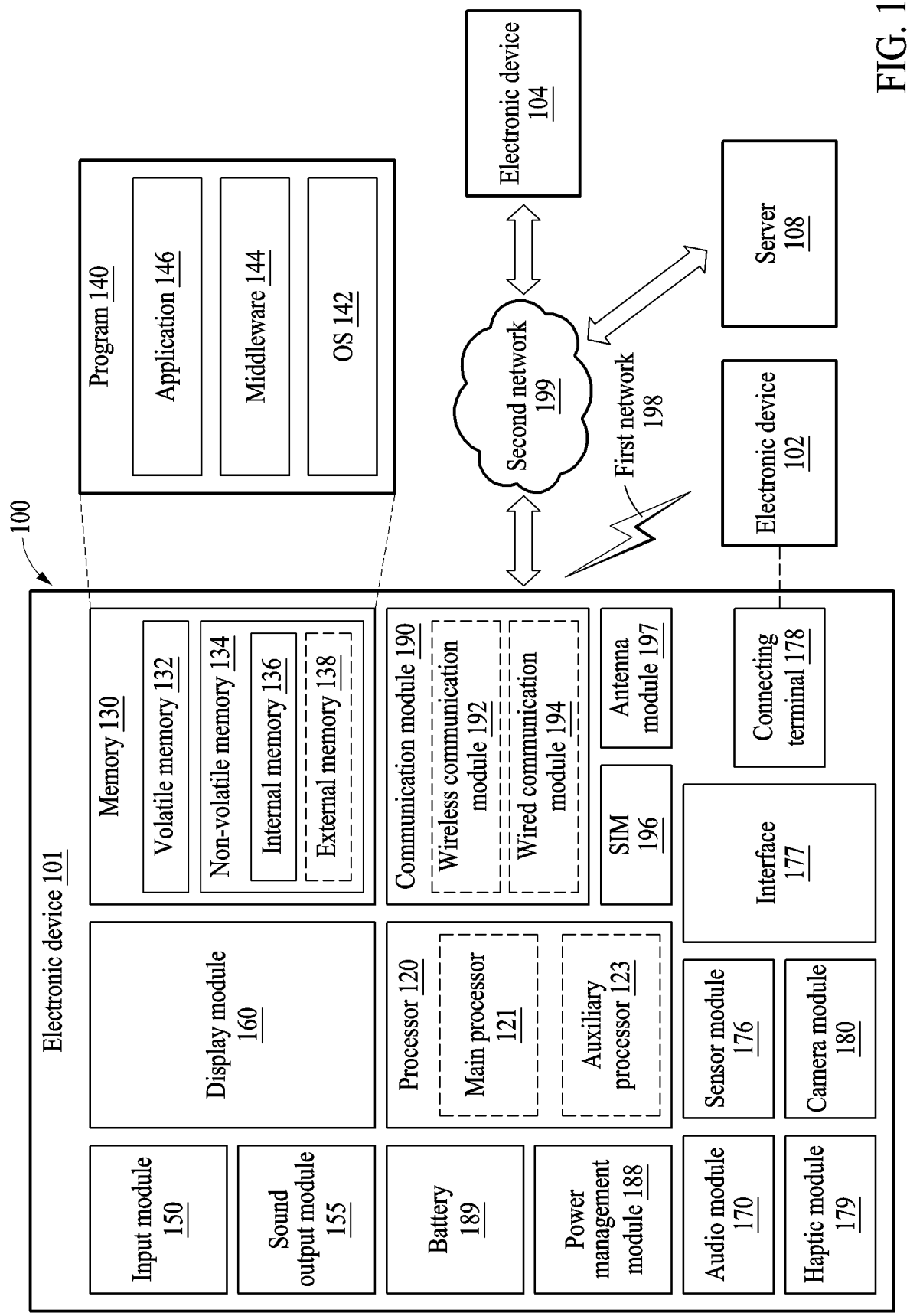
FIG. 1 is a block diagram illustrating an electronic device in a network environment according to an example embodiment.

Hereinafter, example embodiments will be described in detail with reference to the accompanying drawings. When describing the example embodiments with reference to the accompanying drawings, like reference numerals refer to like elements and a repeated description related thereto will be omitted.

Certain example embodiments may provide an electronic device that may prevent damage caused by external impacts such as drop impacts.

Certain example embodiments may provide an electronic device that may absorb external impacts to prevent defects from occurring in its display.

Certain example embodiments may provide an electronic device that may disperse stress caused by external impacts and prevent the stress from being concentrated at a predetermined position.

According to certain example embodiments, by including an opening structure, it is possible to disperse or absorb external impacts and prevent stress from being concentrated on a predetermined position.

According to various example embodiments, it is possible to prevent a display from being damaged by external impacts, thereby enhancing durability of the display and the electronic device in which the display is disposed.

FIG. 1 is a block diagram illustrating an electronic device 101 in a network environment 100 according to an example embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display device 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
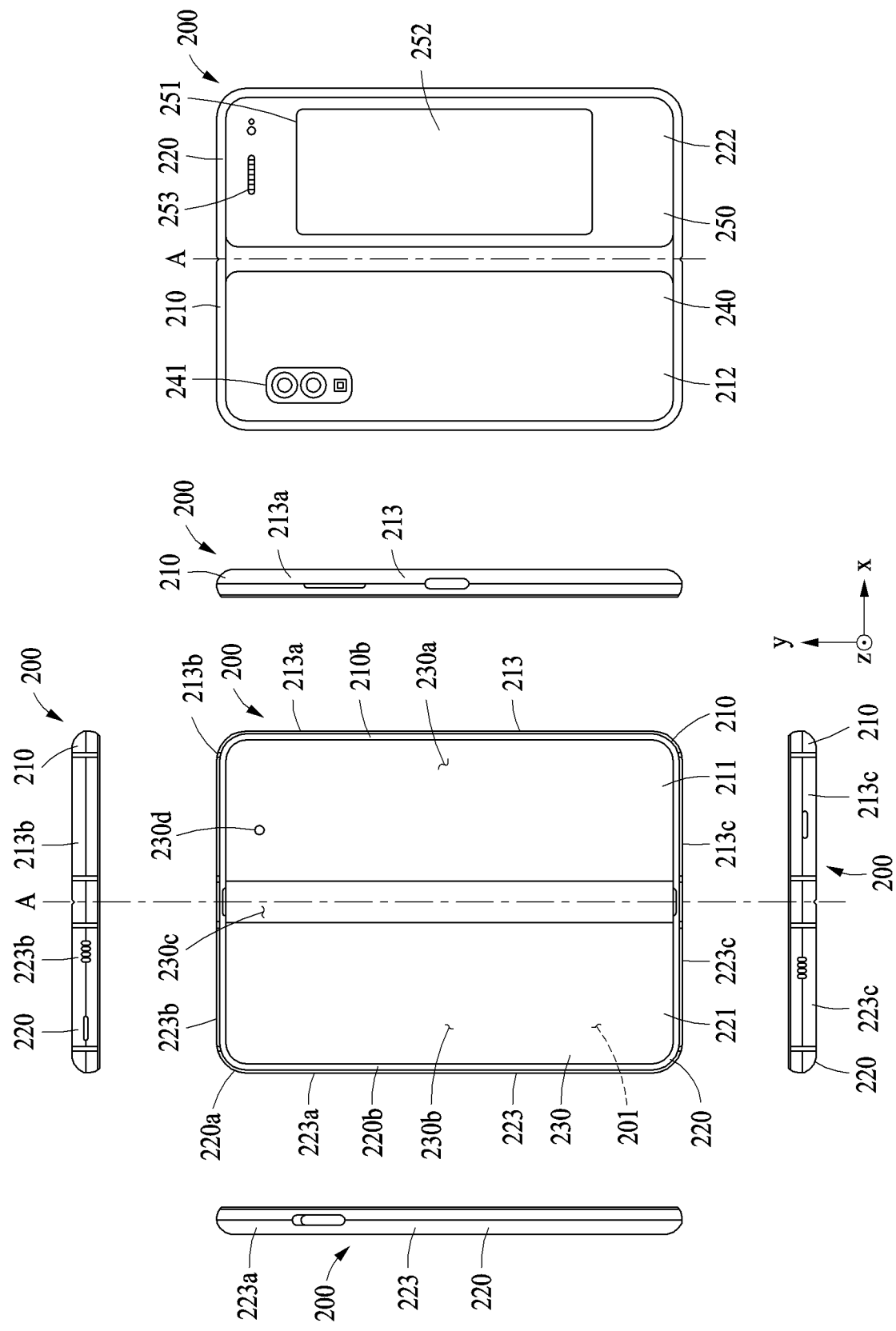
FIG. 2A is a diagram illustrating an unfolded state of an electronic device according to an example embodiment.
Figure 2B:
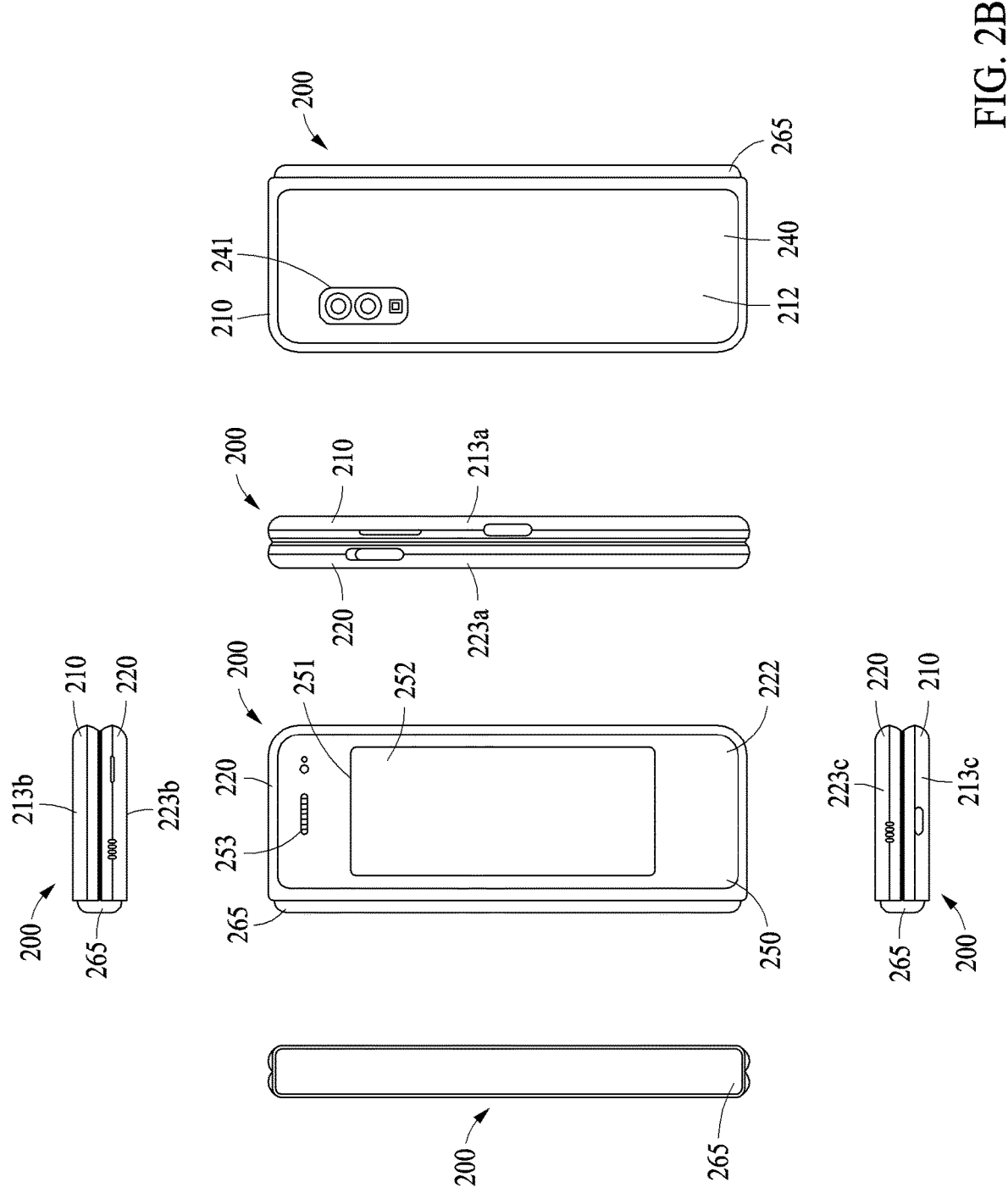
FIG. 2B is a diagram illustrating a folded state of the electronic device of FIG. 2A according to an example embodiment.

FIG. 2A is a diagram illustrating an unfolded state of an electronic device according to an example embodiment. FIG. 2B is a diagram illustrating a folded state of the electronic device of FIG. 2A according to an example embodiment.

Referring to FIG. 2A, according to an example embodiment, an electronic device 200 may be a foldable electronic device. The electronic device 200 may include a pair of housing structures 210 and 220 (e.g., foldable housing structure) that are rotatably coupled via a hinge structure (e.g., hinge structure 264 of FIG. 2C) to be folded with respect to each other, a hinge cover (e.g., hinge cover 265 of FIG. 2B) that covers foldable portions of the pair of housing structures 210 and 220, and a display 230 (e.g., flexible display, foldable display, or first display) that is disposed in a space formed by the pair of housing structures 210 and 220. In the present disclosure, the surface on which the display 230 is disposed may be defined as the front surface of the electronic device 200, and the surface opposite to the front surface may be defined as the rear surface of the electronic device 200. Also, the surface surrounding the space between the front and rear surfaces may be defined as the side surface of the electronic device 200.

In one example embodiment, the pair of housing structures 210 and 220 may include a first housing structure 210, a second housing structure 220, a first rear cover 240, and a second rear cover 250. The pair of housing structures 210 and 220 of the electronic device 200 is not limited to the shapes and combinations shown in FIGS. 2A and 2B, and may be implemented by a combination and/or coupling of other shapes or components. For example, in another example embodiment, the first housing structure 210 and the first rear cover 240 may be integrally formed, and the second housing structure 220 and the second rear cover 250 may be integrally formed.

According to an example embodiment, the first housing structure 210 and the second housing structure 220 are disposed on two sides of the folding axis A, and may be generally symmetrical with respect to the folding axis A. According to an example embodiment, the angle or distance between the first housing structure 210 and the second housing structure 220 may vary depending on whether the electronic device 200 is in a flat state or unfolded state, a folded state, or an intermediate state. According to an example embodiment, unlike the second housing structure 220, the first housing structure 210 may additionally include a sensor area 230d in which one or more sensors are arranged. However, the first housing structure 210 and the second housing structure 220 may be mutually symmetrical in areas other than the sensor area 230d. In another example embodiment, the sensor area 230d may be additionally disposed in another partial area of the second housing structure 220. The sensor area 230d may include, for example, a camera hole area, a sensor hole area, an under display camera (UDC) area, and an under display sensor (UDS) area.

In an example embodiment, in the unfolded state of the electronic device 200, the first housing structure 210 may be connected to the hinge structure (e.g., the hinge structure 264 of FIG. 2C) and may include a first surface 211 facing the front surface of the electronic device 200, a second surface 212 facing away from the first surface 211, and a first side member 213 enclosing at least a portion of the space between the first surface 211 and the second surface 212. In an example embodiment, the first side member 213 may include a first side surface 213a disposed in parallel with the folding axis A, a second side surface 213b extending in the direction perpendicular to the folding axis A from one end of the first side surface 213a, and a third side surface 213c extending in the direction perpendicular to the folding axis A from another end of the first side surface 213a.

In an example embodiment, in the unfolded state of the electronic device 200, the second housing structure 220 may be connected to the hinge structure (e.g., the hinge structure 264 of FIG. 2C) and may include a third surface 221 facing the front surface of the electronic device 200, a fourth surface 222 facing away from the third surface 221, and a second side member 223 enclosing at least a portion of the space between the third surface 221 and the fourth surface 222. In an example embodiment, the second side member 223 may include a fourth side member 223a disposed in parallel with the folding axis A, a fifth side surface 223b extending in the direction perpendicular to the folding axis A from one end of the fourth side surface 223a, and a sixth side surface 223c extending in the direction perpendicular to the folding axis A from another end of the fourth side surface 223a. In an example embodiment, the third surface 221 may face the first surface 211 in the folded state.

In an example embodiment, the electronic device 200 may include a recess 201 formed to accommodate the display 230 when the display 230 is coupled to the first housing structure 210 and the second housing structure 220. The recess 201 may have substantially the same size as the display 230.

In an example embodiment, at least a portion of the first housing structure 210 and the second housing structure 220 may be made of metal material or non-metal material having a level of rigidity selected to support the display 230.

In an example embodiment, the first rear cover 240 may be disposed on the second surface 212 of the first housing structure 210, and may have a substantially rectangular periphery. In an example embodiment, the periphery of the first rear cover 240 may be at least partially wrapped by the first housing structure 210. Similarly, the second rear cover 250 may be disposed on the fourth surface 222 of the second housing structure 220, and a periphery of the second rear cover 250 may be at least partially wrapped by the second housing structure 220.

In the illustrated example embodiment, the first rear cover 240 and the second rear cover 250 may have substantially symmetrical shapes with respect to the folding axis A. In another example embodiment, the first rear cover 240 and the second rear cover 250 may include different shapes. In another example embodiment, the first rear cover 240 may be integrated with the first housing structure 210, and the second rear cover 250 may be integrated with the second housing structure 220.

In an example embodiment, the first rear cover 240, the second rear cover 250, the first housing structure 210, and the second housing structure 220 may provide a space in which various components (e.g., a PCB, an antenna module, a sensor module, or a battery) of the electronic device 200 may be arranged. These various components may be disposed in a structure in which the first rear cover 240, the second rear cover 250, the first housing structure 210, and the second housing structure 220 are coupled to one another. In an example embodiment, one or more components may be disposed or visually exposed on the rear surface of the electronic device 200. For example, one or more components or sensors may be visually exposed through a first rear area 241 of the first rear cover 240. In certain example embodiments, the sensors may include a proximity sensor, a rear camera module, and/or a flash. In another example embodiment, at least a portion of a sub-display 252 (e.g., a second display) may be visually exposed through a second rear area 251 of the second rear cover 250. In another example embodiment, the electronic device 200 may include a speaker module 253 disposed to be exposed through at least one area of the second rear cover 250.

The display 230 may be disposed in a space formed by the pair of housing structures 210 and 220. For example, the display 230 may be seated in the recess 201 formed by the pair of housing structures 210 and 220, and may be disposed to occupy the majority of the front surface of the electronic device 200. Accordingly, the front surface of the electronic device 200 may include the display 230, and an area (e.g., edge area) of the first housing structure 210 and an area (e.g., edge area) of the second housing structure 220, which are adjacent to the display 230. In an example embodiment, the rear surface of the electronic device 200 may include the first rear cover 240, an area (e.g., edge area) of the first housing structure 210 adjacent to the first rear cover 240, the second rear cover 250, and an area (e.g., edge area) of the second housing structure 220 adjacent to the second rear cover 250.

In an example embodiment, the display 230 may refer to a display in which at least one area is deformable into a planar surface or a curved surface. In an example embodiment, the display 230 may include a folding area 230c, a first area 230a disposed on one side (e.g., right area of the folding area 230c) of the folding area 230c, and a second area 230b disposed on the other side (e.g., left area of the folding area 230c) of the folding area 230c. For example, the first area 230a may be disposed in the first surface 211 of the first housing structure 210, and the second area 230b may be disposed in the third surface 221 of the second housing structure 220. In an example embodiment, the area division of the display 230 is merely an example, and the display 230 may be divided into a plurality of areas (e.g., four or more areas, or two different areas) depending on the structure or functions thereof. In an example, as shown in FIG. 2A, the display 230 may be divided into areas based on the folding axis A or the folding area 230c extending in parallel to the y-axis. In another example, the display 230 may be divided into areas based on another folding area (e.g., a folding area parallel to the x-axis) or another folding axis (e.g., a folding axis parallel to the x-axis). The above-described area division of the display is merely physical division based on the pair of housing structures 210 and 220 and the hinge structure (e.g., the hinge structure 264 of FIG. 2C), and the display 230 may display one full screen substantially over the pair of housing structures 210 and 220 and the hinge structure (e.g., the hinge structure 264 of FIG. 2C). In an example embodiment, the first area 230a and the second area 230b may have generally symmetrical shapes about the folding area 230c. In another example embodiment (not shown), the first area 230a and the second area 230b may have shapes asymmetrical to each other. For example, at least a portion of the first area 230a may include a cut notch area, and the first area 230a and the second area 230b may have mutually symmetrical portions and mutually asymmetrical portions.

Figure 2C:
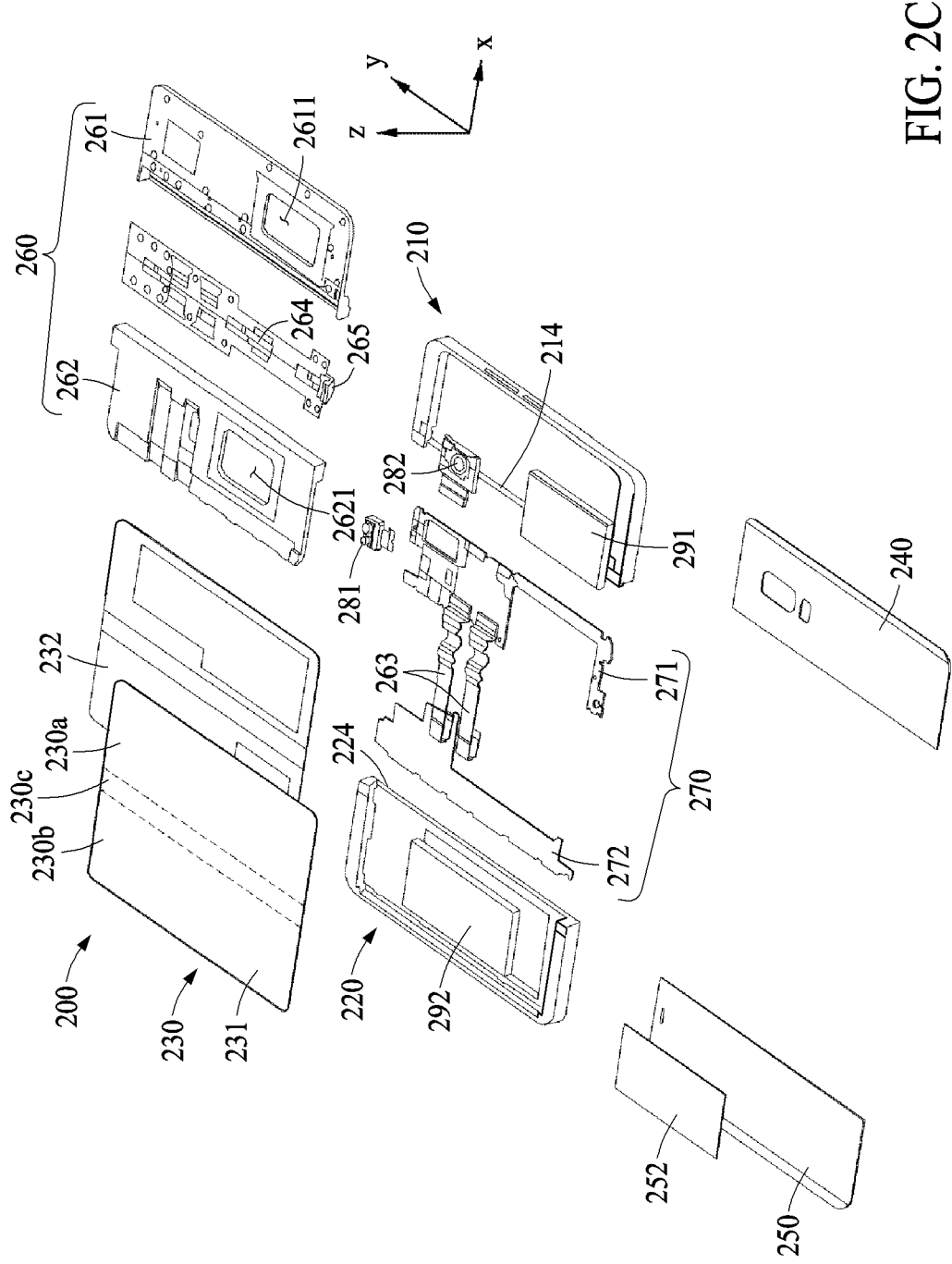
FIG. 2C is an exploded perspective view illustrating the electronic device of FIG. 2A according to an example embodiment.

Referring to FIG. 2B, the hinge cover 265 may be disposed between the first housing structure 210 and the second housing structure 220 to cover internal components (e.g., the hinge structure 264 of FIG. 2C). In an example embodiment, the hinge cover 265 may be covered by a portion of the first housing structure 210 and the second housing structure 220 or may be exposed to the outside, depending on the operating state (e.g., flat state or folded state) of the electronic device 200.

In an example, as shown in FIG. 2A, if the electronic device 200 is in the unfolded state, the hinge cover 265 may not be exposed by being covered by the first housing structure 210 and the second housing structure 220. In another example, as shown in FIG. 2B, if the electronic device 200 is in the folded state (e.g., a completely folded state), the hinge cover 265 may be exposed to the outside between the first housing structure 210 and the second housing structure 220. For example, when the first housing structure 210 and the second housing structure 220 are in the intermediate state in which the first housing structure 210 and the second housing structure 220 are folded to form a predetermined angle therebetween, the hinge cover 265 may be at least partially exposed to the outside of the electronic device 200 between the first housing structure 210 and the second housing structure 220. In this example, the exposed area may be less than that in the completely folded state. In an example embodiment, the hinge cover 265 may include a curved surface.

Hereinafter, operations of the first housing structure 210 and the second housing structure 220 and respective areas of the display 230 depending on the operating state (e.g., flat state and folded state) of the electronic device 200 will be described.

In an example embodiment, when the electronic device 200 is in the flat state (e.g., the state of FIG. 2A), the first housing structure 210 and the second housing structure 220 may form a first angle (e.g., 180 degrees) therebetween, and the first area 230a and the second area 230b of the display may be oriented in the same direction. In addition, the folding area 230c may form substantially the same plane as the first area 230a and the second area 230b. In another example embodiment, when the electronic device 200 is in the flat state, the first housing structure 210 and the second housing structure 220 may be folded to oppose each other after being rotated by a second angle (e.g., 360 degrees) with respect to each other such that the second surface 212 and the fourth surface 222 may face each other. In other words, the first area 230a and the second area 230b of the display may be disposed to face each other in opposite directions.

In an example embodiment, when the electronic device 200 is in the folded state (e.g., the state of FIG. 2B), the first housing structure 210 and the second housing structure 220 may be disposed to face each other. The first area 230a and the second area 230b of the display 230 may form a narrow angle (e.g., about 0 to 10 degrees) therebetween and may face each other. For example, in such a state at least a portion of the folding area 230c may form a curved surface having a predetermined curvature.

In an example embodiment, when the electronic device 200 is in the intermediate state, the first housing structure 210 and the second housing structure 220 may be disposed to form a predetermined angle (e.g., about 90 degrees) therebetween. The first area 230a and the second area 230b of the display 230 may form an angle greater than that in the folded state and smaller than that in the unfolded state. At least a portion of the folding area 230c may form a curved surface with a predetermined curvature, and the curvature may be less than that in the folded state.

FIG. 2C is an exploded perspective view illustrating the electronic device of FIG. 2A according to an example embodiment.

Referring to FIG. 2C, in an example embodiment, the electronic device 200 may include a display 230, a support member assembly 260, at least one PCB 270, a first housing structure 210, a second housing structure 220, a first rear cover 240, and a second rear cover 250. In the present disclosure, the display 230 (e.g., the first display) may be referred to as a display module or a display assembly.

The display 230 may include a display panel 231 (e.g., flexible display panel), and at least one plate 232 or layer on which the display panel 231 is seated. In an example embodiment, the at least one plate 232 may include a conductive plate (e.g., copper (Cu) sheet or stainless steel (SUS) sheet) disposed between the display panel 231 and the support member assembly 260. According to an example embodiment, the conductive plate may be formed to have substantially the same area as that of the display, and the area corresponding to the folding area of the display may be formed to be bendable. The plate 232 may include at least one subsidiary material layer (e.g., graphite member) disposed on the rear surface of the display panel 231. In an example embodiment, the plate 232 may be formed in a shape corresponding to that of the display panel 231.

The support member assembly 260 may include a first support member 261 (e.g., first support plate), a second support member 262 (e.g., second support plate), the hinge structure 264 disposed between the first support member 261 and the second support member 262, a hinge cover 265 that covers the hinge structure 264 when the hinge structure 264 is viewed from the outside, and at least one wiring member 263 (e.g., flexible PCB (FPCB)) crossing the first support member 261 and the second support member 262.

In an example embodiment, the support member assembly 260 may be disposed between the plate 232 and at least one PCB 270. For example, the first support member 261 may be disposed between the first area 230a of the display 230 and a first PCB 271. The second support member 262 may be disposed between the second area 230b of the display 230 and a second PCB 272.

In an example embodiment, at least a portion of the wiring member 263 and the hinge structure 264 may be disposed inside the support member assembly 260. The wiring member 263 may be disposed in a direction (e.g., x-axis direction) crossing the first support member 261 and the second support member 262. The wiring member 263 may be disposed in a direction (e.g., the x-axis direction) substantially perpendicular to the folding axis (e.g., the y-axis or the folding axis A in FIG. 2A) of the folding area 230c.

In an example embodiment, the at least one PCB 270 may include, as described above, the first PCB 271 disposed on the side of the first support member 261 and the second PCB 272 disposed on the side of the second support member 262. The first PCB 271 and the second PCB 272 may be disposed in a space formed by the support member assembly 260, the first housing structure 210, the second housing structure 220, the first rear cover 240, and the second rear cover 250. Components for implementing various functions of the electronic device 200 (e.g. processor) may be mounted on the first PCB 271 and the second PCB 272.

In an example embodiment, a first space of the first housing structure 210 may include the first PCB 271 disposed in a space formed by the first support member 261, a first battery 291 disposed at a position facing a first swelling hole 2611 of the first support member 261, at least one sensor module 281, or at least one camera module 282. The at least one sensor module 281 or at least one camera module 282 may be disposed at a position corresponding to the sensor area 230d or the first rear area 241 in the first space of the first housing structure 210. In an example embodiment, a second space of the second housing structure 220 may include the second PCB 272 disposed in a second space formed by the second support member 262, and a second battery 292 disposed at a position facing a second swelling hole 2621 of the second support member 262. According to an example embodiment, the first housing structure 210 and the first support member 261 may be integrally formed. According to an example embodiment, the second housing structure 220 and the second support member 262 may also be integrally formed. According to an example embodiment, the sub-display 252 may be disposed in the second space of the second housing structure 220. According to an example embodiment, the sub-display 252 (e.g., the second display) may be disposed to be visible from the outside through at least a partial area of the second rear cover 250.

In an example embodiment, the first housing structure 210 may include a first rotation support surface 214, and the second housing structure 220 may include a second rotation support surface 224 corresponding to the first rotation support surface 214. The first rotation support surface 214 and the second rotation support surface 224 may include curved surfaces corresponding to curved surfaces included in the hinge cover 265.

In an example embodiment, when the electronic device 200 is in the unfolded state (e.g., the state of FIG. 2A), the first rotation support surface 214 and the second rotation support surface 224 may cover the hinge cover 265 such that the hinge cover 265 may not be exposed or may be minimally exposed through the rear surface of the electronic device 200. In an example embodiment, when the electronic device 200 is in the folded state (e.g., the state of FIG. 2B), the first rotation support surface 214 and the second rotation support surface 224 may rotate along the curved surface included in the hinge cover 265 so that the hinge cover 265 may be maximally exposed through the rear surface of the electronic device 200.

The electronic device according to certain example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that certain example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

According to certain example embodiments, each component (e.g., module or program) of the above-described components may include a single entity or multiple entities, and some of the multiple entities may be separately disposed in different components. According to certain example embodiments, one or more of the above-described components may be omitted, or one or more other components may be added. Alternatively or additionally, a plurality of components (e.g., modules or programs) may be integrated into a single component. In such a case, according to certain example embodiments, the integrated component may still perform one or more functions of each of the plurality of components in the same or similar manner as they are performed by a corresponding one of the plurality of components before the integration.

Figure 3:
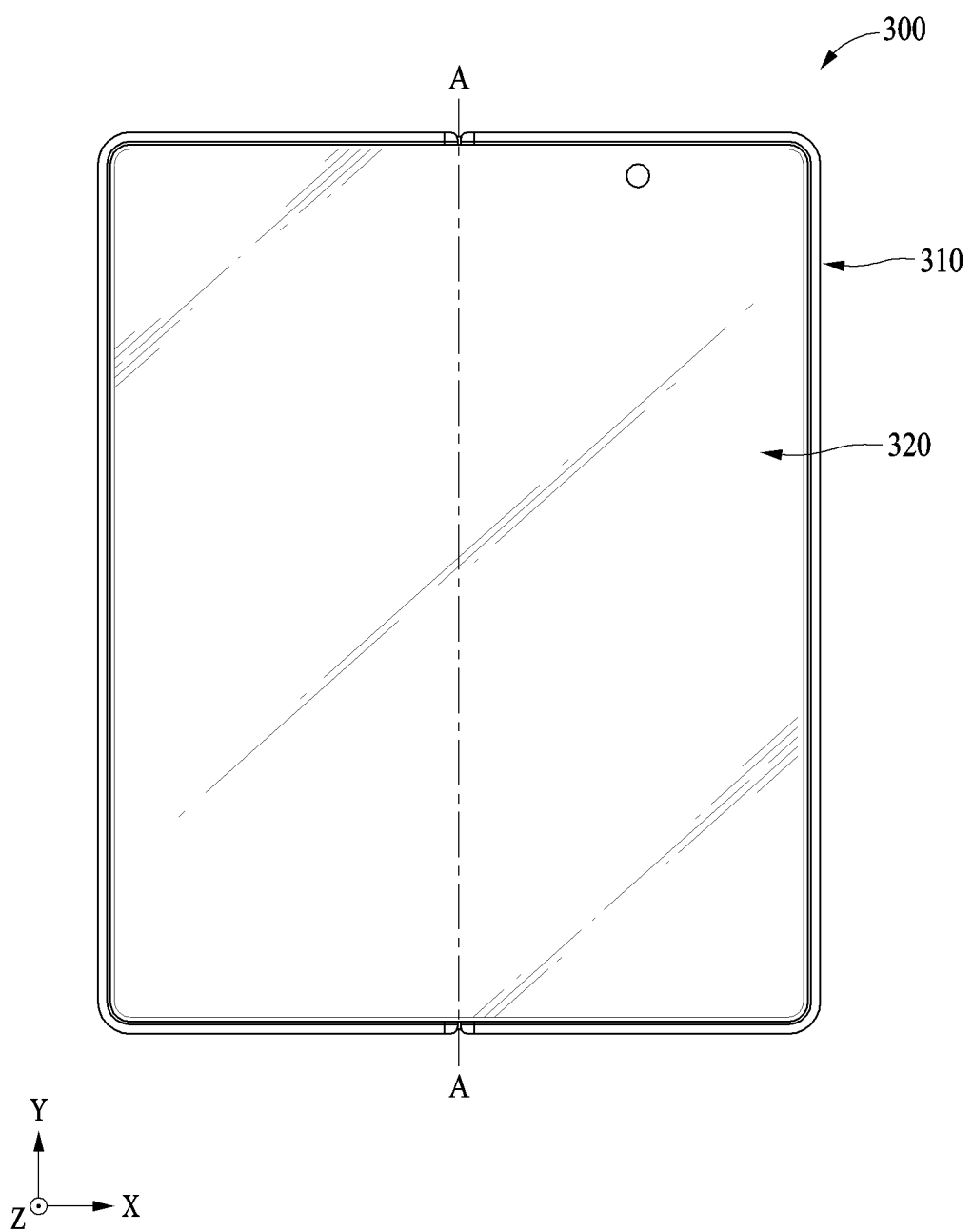
FIG. 3 is a diagram illustrating a front surface of an electronic device according to an example embodiment.

FIG. 3 is a diagram illustrating a front surface of an electronic device according to an example embodiment.

Referring to FIG. 3, an electronic device 300 (e.g., the electronic device 101 of FIG. 1 or the electronic device 200 of FIGS. 2A to 2C) according to an example embodiment may be a foldable electronic device. For example, the electronic device 300 may be folded or unfolded about the folding axis A. However, this is merely an example, and the size, shape, structure, and folding axis of the electronic device 300 are not limited thereto. For example, the electronic device 300 of FIG. 3 may include the folding axis A extending in a Y-axis direction, which is the longitudinal direction of the device, but an electronic device according to another example embodiment may also include a folding axis extending in the X-axis direction which is the latitudinal direction.

In an example embodiment, the electronic device 300 may include a housing 310 and a display module 320 (e.g., the display module 160 of FIG. 1 or the display 230 of FIGS. 2A and 2C).

Figure 4:
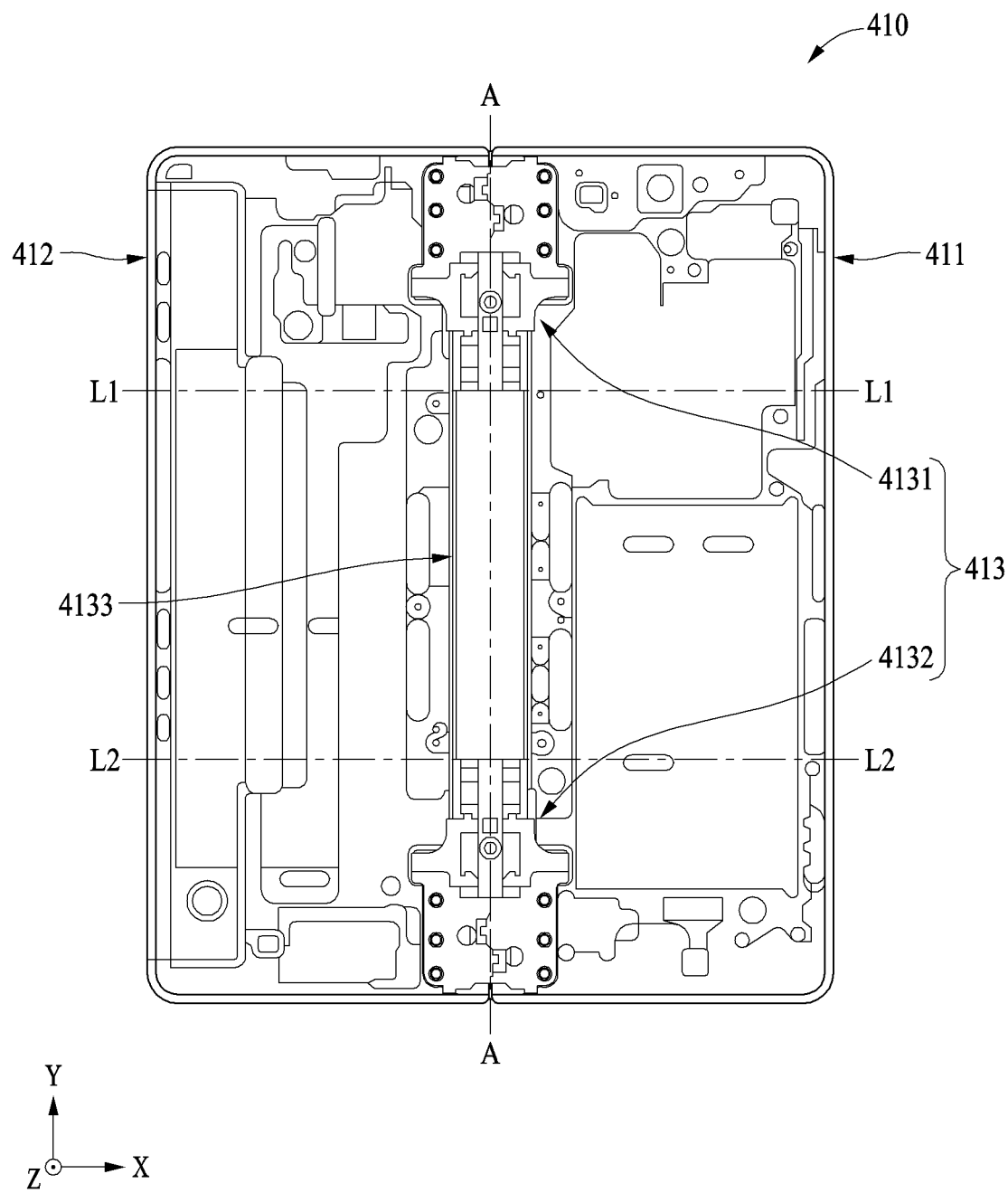
FIG. 4 is a diagram illustrating a front surface of a housing structure according to an example embodiment.

FIG. 4 is a diagram illustrating a front surface of a housing structure according to an example embodiment.

Referring to FIG. 4, a housing 410 (e.g., the housing 310 of FIG. 3) according to an example embodiment may form at least a portion of the external surfaces of an electronic device (e.g., the electronic device 300 of FIG. 3). The housing 410 may include a first housing structure 411 (e.g., the first housing structure 210 of FIGS. 2A to 2C), a second housing structure 412 (e.g., the second housing structure 220 of FIGS. 2A to 2C), and a hinge structure 413 (e.g., the hinge structure 264 of FIG. 2C).

In an example embodiment, the first housing structure 411 and the second housing structure 412 may be rotatably connected to each other by the hinge structure 413. An angle or distance between the first housing structure 411 and the second housing structure 412 may vary depending on whether the electronic device 300 is in the flat state or unfolded state, the folded state, or the intermediate state. The first housing structure 411 and the second housing structure 412 may provide a space in which a display module (e.g., the display module 320 of FIG. 3) is disposed. A hole for arranging a camera or a sensor may be formed in at least a portion of the first housing structure 411 and the second housing structure 412. Sizes, shapes, and structures of the first housing structure 411 and the second housing structure 412 illustrated in FIG. 4 are merely an example, and the example embodiments are not limited thereto.

In an example embodiment, the hinge structure 413 may rotatably connect the first housing structure 411 and the second housing structure 412 to each other. The hinge structure 413 may have a folding axis A (e.g., the folding axis A of FIG. 3) that is a pivot center of rotation. The first housing structure 411 and the second housing structure 412 may be unfolded or folded with respect to each other about the folding axis A. For example, the hinge structure 413 may have the folding axis A extending in the Y-axis direction, as shown in FIG. 4. However, the direction of the folding axis A is not limited thereto, and another hinge structure according to an example embodiment may also include a folding axis extending in the X-axis direction.

In an example embodiment, the hinge structure 413 may include a first hinge structure 4131 and a second hinge structure 4132. The first hinge structure 4131 may be located on one side (e.g., the upper side based on FIG. 4) of the first housing structure 411 and the second housing structure 412, and the second hinge structure 4132 may be located on the other side (e.g., the lower side based on FIG. 4) of the first housing structure 411 and the second housing structure 412. The first hinge structure 4131 and the second hinge structure 4132 may have substantially the same folding axis A. The first hinge structure 4131 and the second hinge structure 4132 may be disposed on a hinge cover 4133 (e.g., the hinge cover 265 of FIGS. 2B and 2C). The hinge cover 4133 may be disposed between the first housing structure 411 and the second housing structure 412 and configured to cover the first hinge structure 4131 and the second hinge structure 4132. The hinge cover 4133 may be covered by portions of the first housing structure 411 and the second housing structure 412 or may be exposed to the outside, depending on the operating state (e.g., flat state or folded state) of the electronic device 300.

Figure 5B:
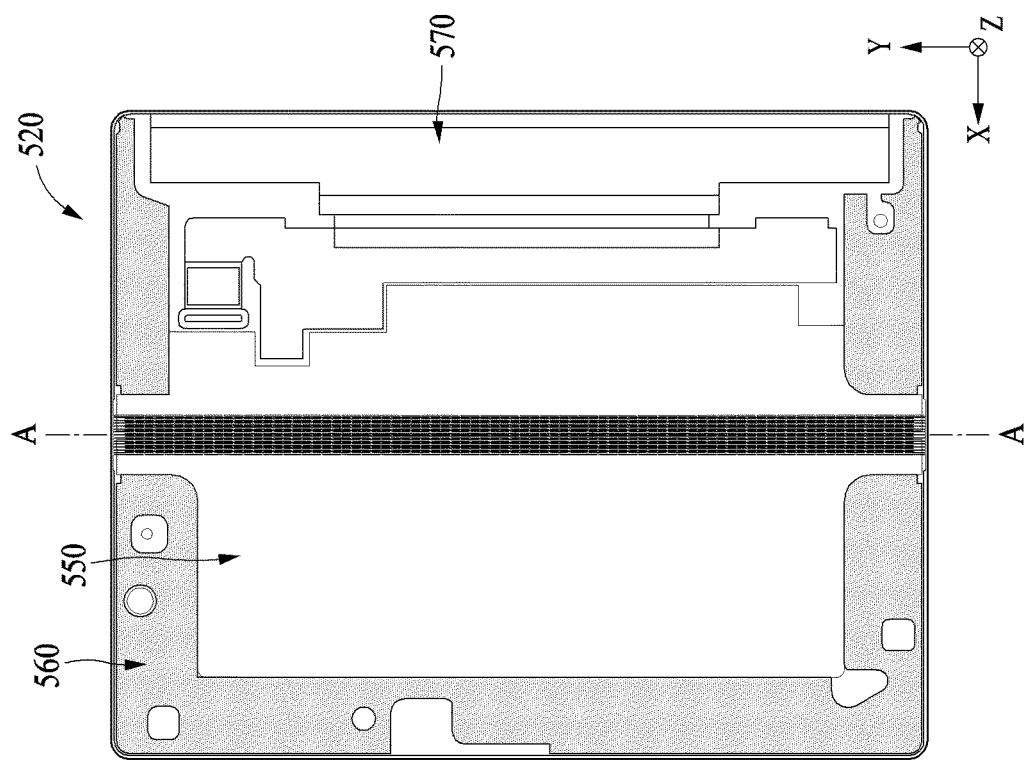
FIG. 5B is a diagram illustrating a rear surface of the display module of FIG. 5A according to an example embodiment.
Figure 5A:
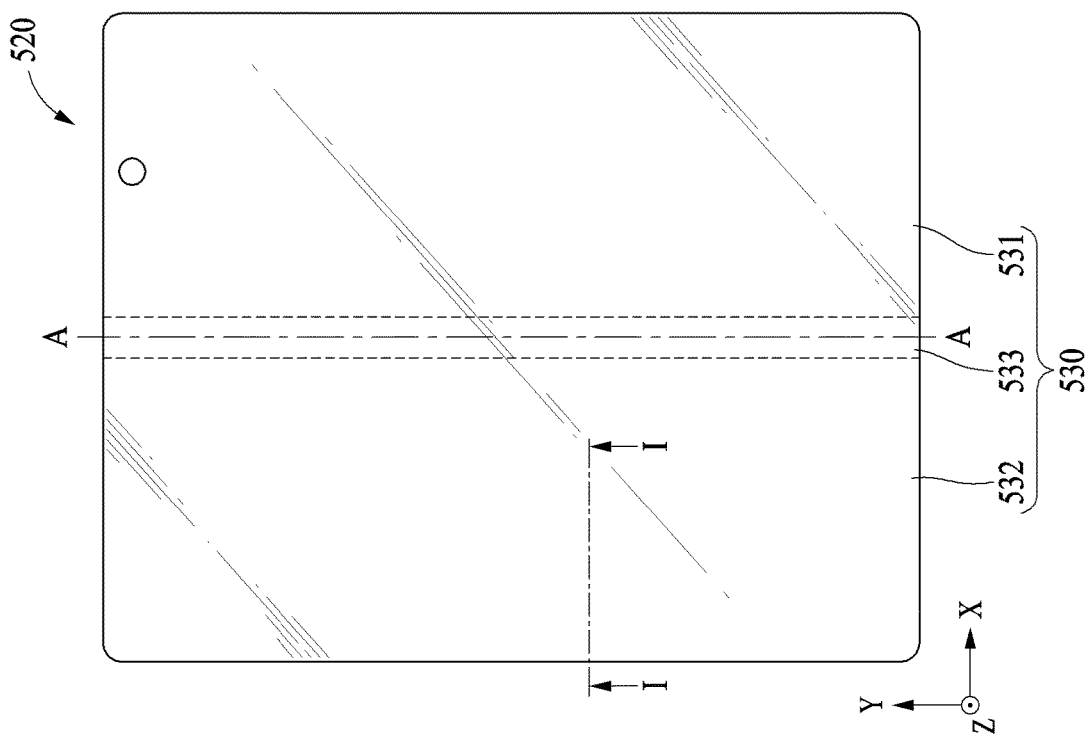
FIG. 5A is a diagram illustrating a front surface of a display module according to an example embodiment.
Figure 5C:
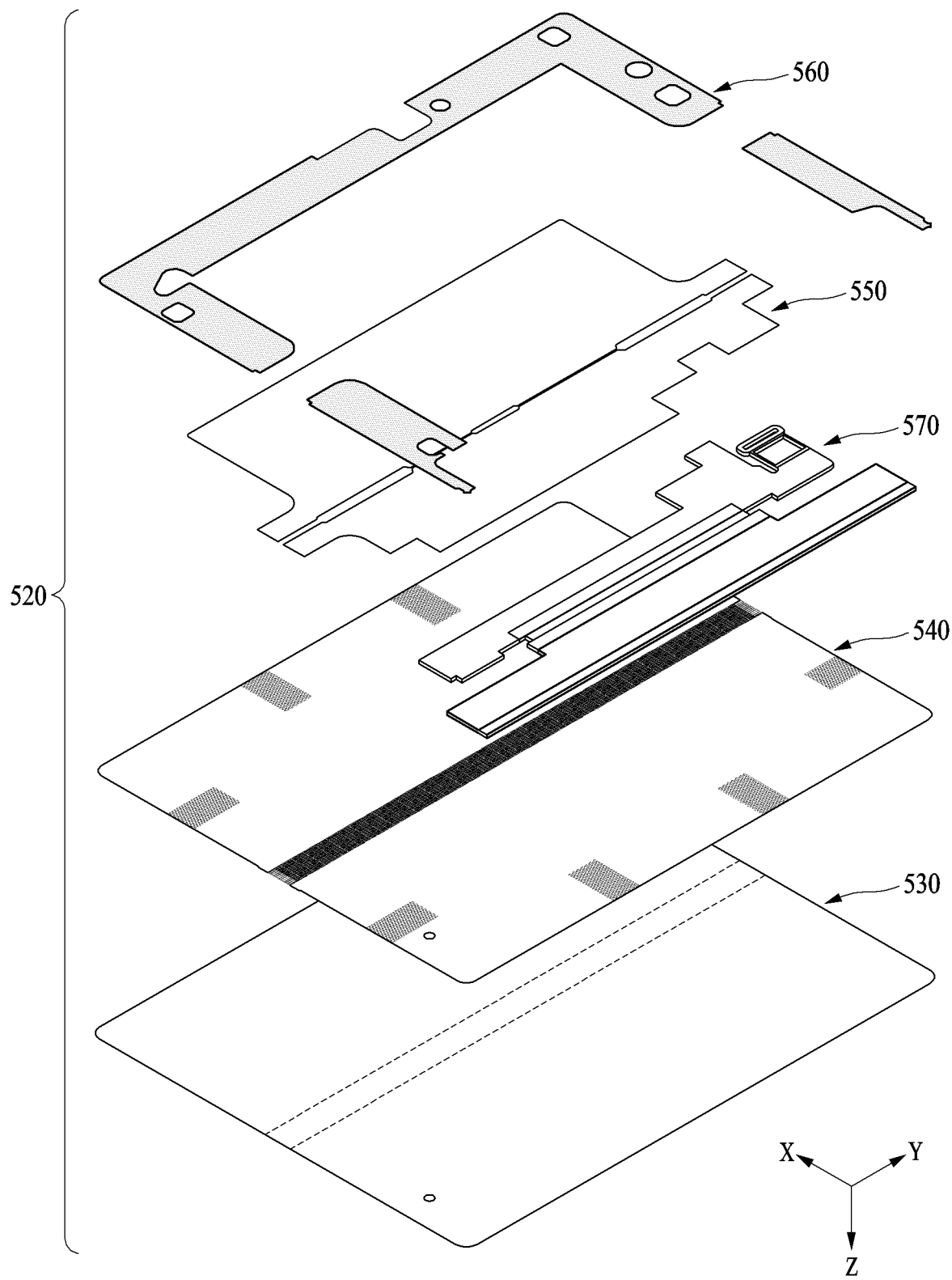
FIG. 5C is a diagram illustrating an exploded perspective view of the display module of FIG. 5A according to an example embodiment.

FIG. 5A is a diagram illustrating a front surface of a display module according to an example embodiment. FIG. 5B is a diagram illustrating a rear surface of the display module of FIG. 5A according to an example embodiment. FIG. 5C is a diagram illustrating an exploded perspective view of the display module of FIG. 5A according to an example embodiment. FIG. 5D is a cross-sectional view taken along line I-I of FIG. 5A in the state in which housing is coupled according to an example embodiment.

Referring to FIGS. 5A to 5D, the display module 520 according to an example embodiment may display visual information (e.g., text, video, and/or image) to a user. The display module 520 may be formed in a shape corresponding to the housing (e.g., the housing 410 of FIG. 4) and disposed in a space formed by the housing 410. For example, as shown in FIG. 5D, the display module 520 may be disposed in the space formed by the housing 410 so that a front surface (e.g., a +Z-axis directional surface) may face the outside.

In an example embodiment, the display module 520 may be folded or unfolded. For example, the display module 520 may be folded or unfolded about a folding axis A (e.g., the folding axis A of FIG. 3 or the folding axis A of FIG. 4). The display module 520 may be deformed into a shape corresponding to a state of the electronic device (e.g., the electronic device 300 of FIG. 3), for example, the flat state or unfolded state, the folded state, or the intermediate state.

In an example embodiment, the display module 520 may include a flexible display 530, a first plate 540, a second plate 550, an adhesive member 560, and a PCB 570. As shown in FIG. 5C, the display module 520 may be formed by stacking the flexible display 530, the first plate 540, the second plate 550, the adhesive member 560, and the PCB 570. However, this is merely an example, and a configuration of the display module 520 is not limited thereto.

Figure 5E:
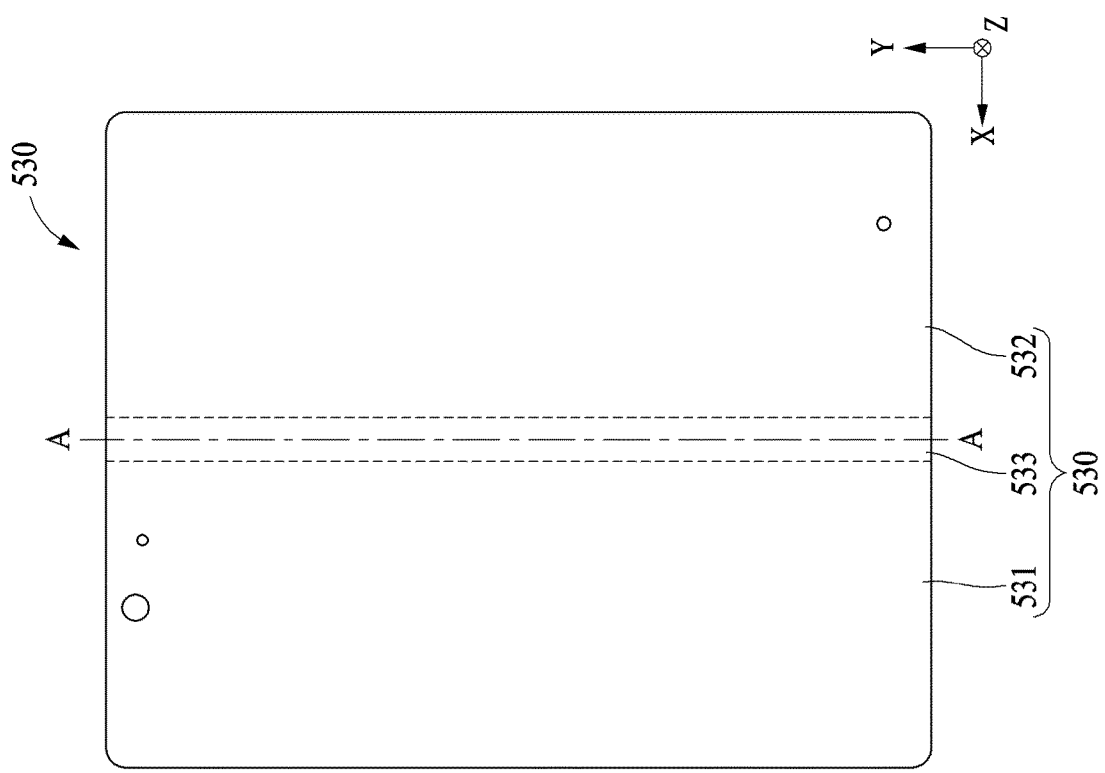
FIG. 5E is a diagram illustrating a rear surface of a flexible display according to an example embodiment.
Figure 5D:
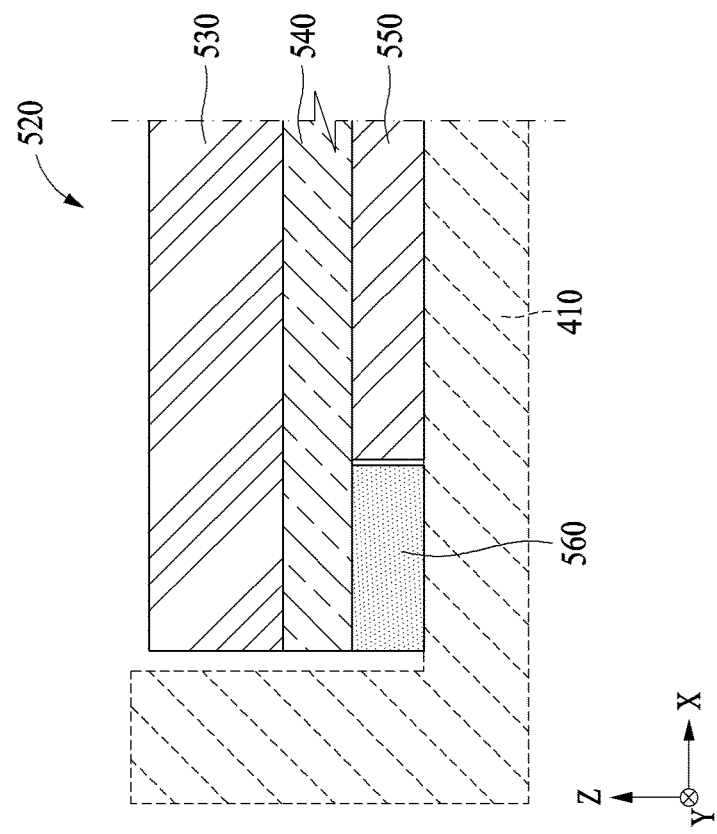
FIG. 5D is a cross-sectional view taken along line I-I of FIG. 5A in the state in which housing is coupled according to an example embodiment.
Figure 5F:
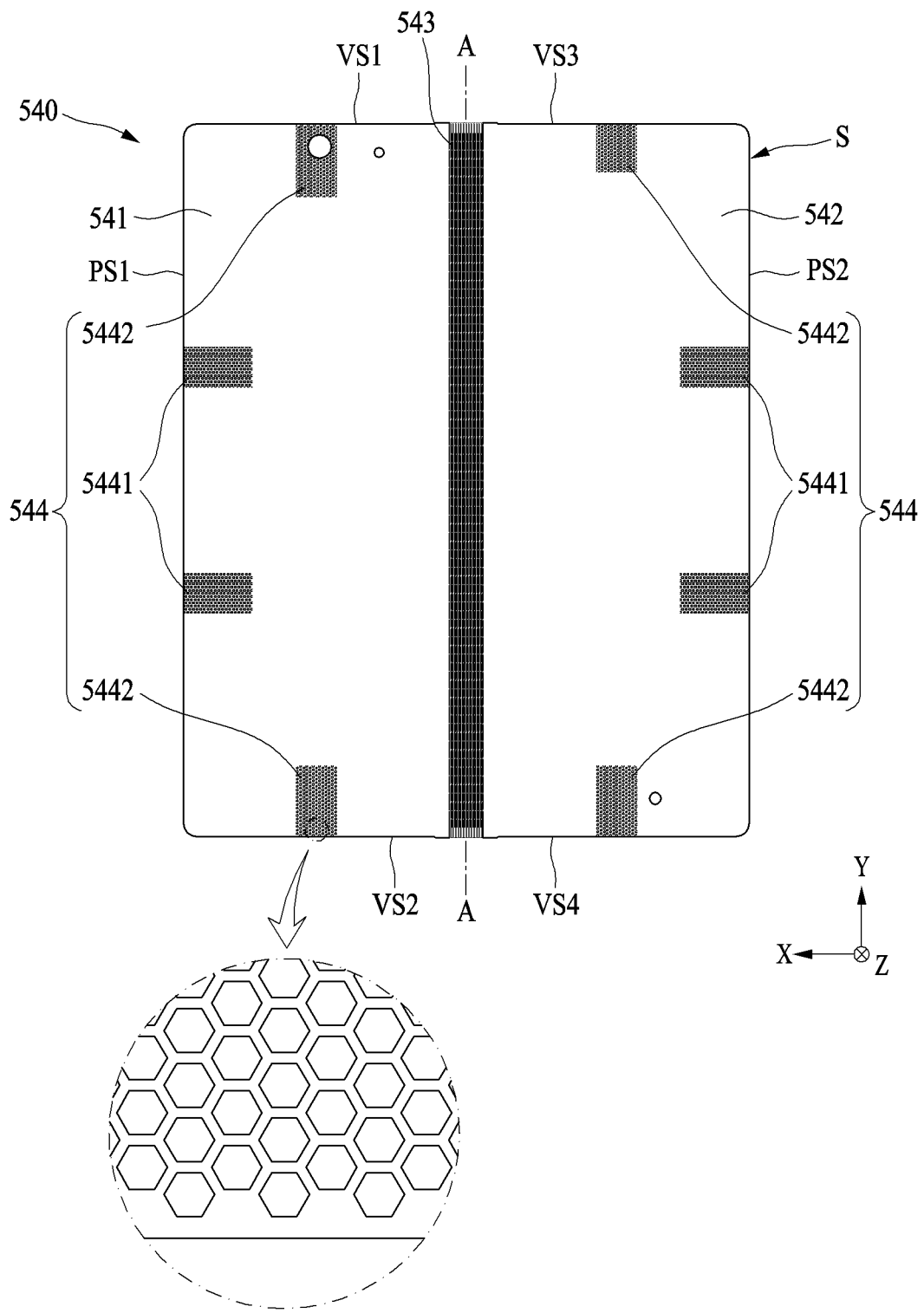
FIG. 5F is a diagram illustrating a rear surface of a first plate according to an example embodiment.
Figure 5H:
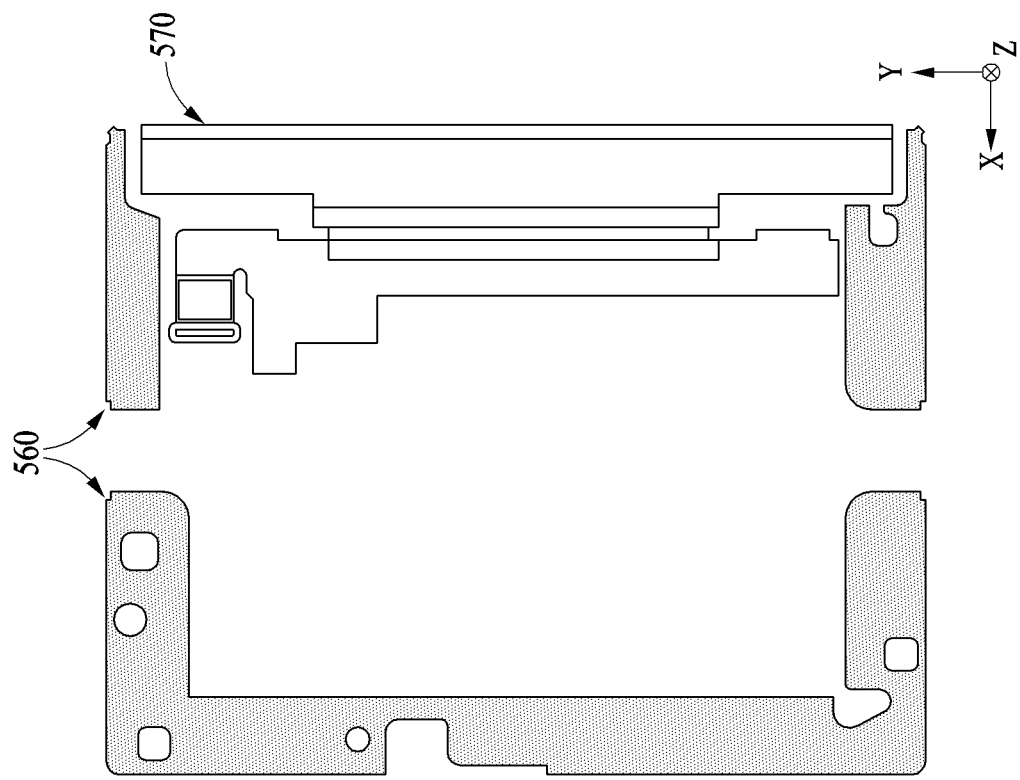
FIG. 5H is a diagram illustrating rear surfaces of an adhesive member and a PCB according to an example embodiment.
Figure 5G:
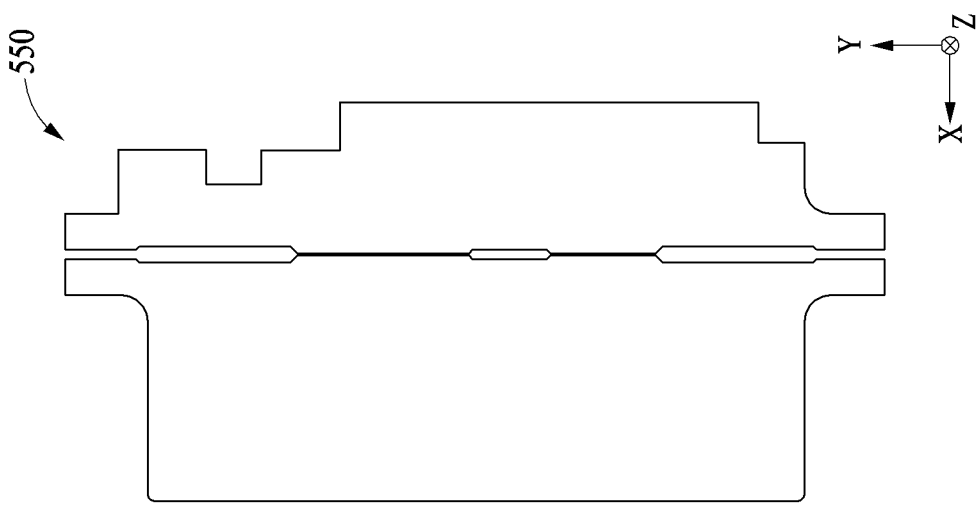
FIG. 5G is a diagram illustrating a rear surface of a second plate according to an example embodiment.

FIG. 5E is a diagram illustrating a rear surface of a flexible display according to an example embodiment. FIG. 5F is a diagram illustrating a rear surface of a first plate according to an example embodiment. FIG. 5G is a diagram illustrating a rear surface of a second plate according to an example embodiment. FIG. 5H is a diagram illustrating rear surfaces of an adhesive member and a PCB according to an example embodiment.

Referring to FIGS. 5A, and 5C to 5E, in an example embodiment, the flexible display 530 may display visual information on a front surface (e.g., the +Z-axis directional surface). The flexible display 530 may be folded or unfolded about the folding axis A (e.g., the folding axis A of FIG. 3 or the folding axis A of FIG. 4). The flexible display 530 may include a first area 531, a second area 532, and a third area 533.

In an example embodiment, the first area 531 may be an area facing a first housing structure (e.g., the first housing structure 411 of FIG. 4). For example, the first area 531 may be seated and disposed in the first housing structure 411. The second area 532 may be an area facing a second housing structure (e.g., the second housing structure 412 of FIG. 4). For example, the second area 532 may be seated and disposed in the second housing structure 412. The third area 533 may be an area that connects the first area 531 and the second area 532. In the flexible display 530, an angle formed by the first area 531 and the second area 532 may be adjusted via shape deformation of the third area 533. The overall shape of the flexible display 530 may be changed in response to a folding operation of the corresponding electronic device (e.g., the electronic device 300 of FIG. 3). For example, the flexible display 530 may be deformed to be in a first state (e.g., the unfolded state of FIG. 2A) in which the first area 531 and the second area 532 form substantially the same plane, a second state (e.g., the folded state of FIG. 2B) in which the first area 531 and the second area 532 face each other, or an intermediate state in which the first area 531 and the second area 532 form a predetermined angle between the first state and the second state.

In an example embodiment, the first area 531 and the second area 532 of the flexible display 530 may be substantially symmetrical with respect to the third area 533. However, the first area 531 and the second area 532 may be partially asymmetrical to each other, when for example one of the first area 531 and the second area 532 includes a notch portion partially cut to expose other components (e.g., a camera or a sensor) to the front surface of the electronic device (e.g., the electronic device 300 of FIG. 3).

The above-described area division of the flexible display 530 is merely an example, and the flexible display 530 may be divided into a plurality of areas depending on a function and structure required for the electronic device (e.g., the electronic device 300 of FIG. 3). For example, the flexible display 530 may be divided into areas based on the direction substantially parallel to the Y-axis as shown in FIG. 5E, but in an example embodiment, the flexible display 530 may also be divided into areas based on the direction substantially parallel to the X-axis.

In an example embodiment, the flexible display 530 may include a display panel, a touch panel, a polarizing film, and a window layer. The display panel, the touch panel, the polarizing film, and the window layer may be attached using pressure-sensitive adhesive (PSA). However, this is merely an example, and the configuration of the flexible display 530 is not limited thereto.

Referring to FIGS. 5A to 5F, in an example embodiment, the first plate 540 (e.g., the plate 232 of FIG. 2C) may be disposed between the flexible display 530 and the housing (e.g., the housing 410 of FIG. 4). The first plate 540 may support the flexible display 530 with respect to the housing 410. The first plate 540 may be formed in a shape corresponding to that of the flexible display 530. For example, the first plate 540 may be connected to a rear surface (e.g., −Z-axis directional surface) of the flexible display 530. For example, the first plate 540 may include a metal material. The first plate 540 may enhance durability of the flexible display 530 and prevent foreign substances from being introduced into the flexible display 530 from the outside. The first plate 540 may also function as a heat transfer member to transfer heat generated by the flexible display 530 to the outside of the device.

In an example embodiment, the first plate 540 may include a first planar portion 541, a second planar portion 542, a bendable portion 543, and an opening structure 544.

In an example embodiment, the first planar portion 541 may face the first area 531 of the flexible display 530. The first planar portion 541 may be formed in a shape corresponding to that of the first area 531. The second planar portion 542 may face the second area 532 of the flexible display 530. The second planar portion 542 may be formed in a shape corresponding to that of the second area 532. The bendable portion 543 may face the third area 533 of the flexible display 530. The bendable portion 543 may connect the first planar portion 541 and the second planar portion 542 and may be bendably. An example of the bendable portion 543 will be described in detail with reference to FIGS. 6A to 6D below.

In an example embodiment, the opening structure 544 may reduce the force of impacts upon the first plate 540. With the inclusion of the opening structure 544, the first plate 540 may be at least partially stretched or compressed by external impacts. For example, the opening structure 544 may include a plurality of openings. The plurality of openings may be arranged in a designated pattern. For example, the opening structure 544 may have a honeycomb structure to be at least partially stretchable or compressible by external impacts. The honeycomb structure may refer to a pattern in which hexagonal-shaped openings are repeatedly arranged, as shown in FIG. 5F. However, the shape of the opening structure 544 is not limited thereto, and the opening structure 544 may be formed in various shapes. For example, the opening structure 544 may be formed in a pattern in which diamond-shaped or triangular-shaped openings are repeatedly arranged.

In an example embodiment, one or more opening structures 544 may be formed at designated positions on the outer sides S of at least one of the first planar portion 541 and the second planar portion 542. The outer sides S of the first planar portion 541 and the second planar portion 542 may be sides or edges of the planar portions other than the sides in which the first planar portion 541 and the second planar portion 542 that contact the bendable portion 543. Hereinafter, for convenience of description, sides parallel to the folding axis A in the outer sides S of the first planar portion 541 and the second planar portion 542 may be referred to as "parallel sides PS1 and PS2", and sides perpendicular to the folding axis A in the outer sides S of the first planar portion 541 and the second planar portion 542 may be referred to as "vertical sides VS1, VS2, VS3, and VS4".

In an example embodiment, the opening structure 544 may include a first opening structure 5441 and a second opening structure 5442. Opening structures 544 may be formed substantially symmetrically with respect to the folding axis A. In other embodiments however, opening structures 544 may be formed asymmetrically with respect to the folding axis A.

In an example embodiment, the first opening structure 5441 may be formed on at least one of the parallel sides PS1 and PS2 of the first planar portion 541 and the second planar portion 542. For example, one or more first opening structures 5441 may be formed on each of the parallel side PS1 of the first planar portion 541 and the parallel side PS2 of the second planar portion 542.

In an example embodiment, each of the first opening structures 5441 may be formed such that the parallel side PS1 or PS2 is divided into three parts. For example, the first opening structures 5441 may trisect the parallel side PS1 or PS2, as shown in FIG. 5F. In an example embodiment, the first opening structure 5441 may be formed at a point where the parallel side PS1 or PS2 meets an imaginary extension line (e.g., an extension line L1 or L2 of FIG. 4) extending in a direction perpendicular to the folding axis A (e.g., the folding axis A of FIG. 4) from an inner end portion of the hinge structure (e.g., ends of the first hinge structure 4131 and the second hinge structure 4132 of FIG. 4). The first hinge structure 4131 and the second hinge structure 4132 may be made of, for example, stainless steel (SUS) having high rigidity. Accordingly, positions in which the first hinge structure 4131 and the second hinge structure 4132 are disposed may have extremely high overall rigidity in comparison to other positions inside the electronic device, and thus rigidity in inner end portions (e.g., boundary portions) of the first hinge structure 4131 and the second hinge structure 4132 may vary discontinuously. Accordingly, the greatest deformation may occur at the inner end portions of the first hinge structure 4131 and the second hinge structure 4132 when an external impact occurs for the electronic device. Thus, by forming the first opening structure 5441 on the extension lines L1 and L2 extending from the inner end portions of the first hinge structure 4131 and the second hinge structure 4132, it may be possible to prevent excessive deformation or stress concentrated in these positions. However, this is merely an example, and the shape, size, or position of the first opening structure 5441 is not limited thereto. The first opening structure 5441 may have various shapes, sizes, and/or positions. For example, at least a portion of a plurality of first opening structures 5441 may have shapes and/or sizes (e.g., sizes of honeycomb structures) different from those of the other portions.

In an example embodiment, the second opening structure 5442 may be formed on at least one of the vertical sides VS1, VS2, VS3, and VS4 of the first planar portion 541 and the second planar portion 542. For example, one or more second opening structures 5442 may be formed on each of the vertical sides VS1 and VS2 of the first planar portion 541 and the vertical sides VS3 and VS4 of the second planar portion 542.

In an example embodiment, the second opening structure 5442 may be formed to bisect the vertical side VS1, VS2, VS3, or VS4. However, this is merely an example, and the position of the second opening structure 5442 is not limited thereto. For example, the second opening structure 5442 may be formed at the midpoint between the folding axis A and each of the parallel sides PS1 and PS2. In other examples, the second opening structure 5442 may be closer to each of the parallel sides PS1 and PS2 than the folding axis A or be closer to the folding axis A.

In an example embodiment, the opening structure 544 may be formed to extend inward from each of the outer sides S. The direction in which the opening structure 544 extends inward may be a direction perpendicular to each of the outer sides S. For example, the first opening structure 5441 may extend in an inward direction (e.g., +X-axis direction or −X-axis direction) from an end portion of the parallel side PS1 or PS2. For example, the second opening structure 5442 may extend in an inward direction (e.g., a +Y-axis direction or a −Y-axis direction) from an end portion of the vertical side VS1, VS2, VS3, or VS4.

In an example embodiment, the opening structure 544 may extend inward from each of the outer sides S, with substantially the same width. For example, as shown in FIG. 5F, the opening structure 544 may extend inward with substantially the same width so that the opening structure 544 are substantially rectangular. In an example embodiment, the opening structure 544 may extend inward from each of the outer sides S such that the width of at least a portion of the opening structure 544 may decrease as the opening structure 544 extends inward. For example, the opening structure 544 may be formed in a trapezoidal or triangular shape with the width decreasing toward the inside. In yet another example, the opening structure 544 may include some rectangular shapes and some trapezoidal shapes that alternate. However, this is merely an example, and the shape and/or size of the opening structure 544 is not limited thereto. The opening structure 544 may be formed in various shapes and/or sizes. For example, at least a portion of a plurality of opening structures 544 may have shape or size different from those of the other portions.

Referring to FIGS. 5B to 5D, 5G, and 5H, in an example embodiment, the second plate 550 may be disposed between the first plate 540 and the housing (e.g., the housing 410 of FIG. 4). The second plate 550 may support the first plate 540 with respect to the housing 410. For example, the second plate 550 may be connected to a rear surface (e.g., −Z-axis directional surface) of the first plate 540. For example, the second plate 550 may be made of a metal material (e.g., copper). The second plate 550 may function as a heat transfer member to transfer heat generated by the flexible display 530 to the outside of the device.

In an example embodiment, the adhesive member 560 may attach the first plate 540 to the housing (e.g., the housing 410 of FIG. 4). For example, the adhesive member 560 may be disposed along at least a portion of the outer sides S of the first plate 540. For example, the adhesive member 560 may be implemented by an adhesive tape. For example, the adhesive member 560 may be implemented by a pressure-sensitive adhesive (PSA). For example, the adhesive member 560 may be implemented by an adhesive bond. However, this is merely an example, and the adhesion mechanism of the adhesive member 560 is not limited thereto.

In an example embodiment, elements for implementing functions of the flexible display 530 may be disposed on the PCB 570 (e.g., the PCB 270 of FIG. 2C). The PCB 570 may be electrically connected to the flexible display 530. For example, the PCB 570 may be formed as a FPCB. The PCB 570 may be disposed on one side of the first plate 540. For example, as shown in FIG. 5B, the PCB 570 may be disposed along one side on a rear surface (e.g., the −Z-axis directional surface) of the first planar portion 541. However, this is merely an example, and the position at which the PCB 570 is disposed is not limited thereto. For example, the PCB 570 may be attached to the first plate 540 using a separate adhesive member. For example, the PCB 570 may be fastened to the first plate 540 by a screw, a snap-fit, or be bonded or welded.

In an example embodiment, the second plate 550 may not overlap the adhesive member 560 in the Z-axis direction. For example, the adhesive member 560 may be disposed along at least a portion of the outer sides S of the first plate 540, and the second plate 550 may be formed in a shape corresponding to an inner space formed by the adhesive member 560. The second plate 550 may stably support the first plate 540 by filling the inner space formed by the adhesive member 560. The second plate 550 also may not overlap the PCB 570 in the Z-axis direction.

Figure 5I:
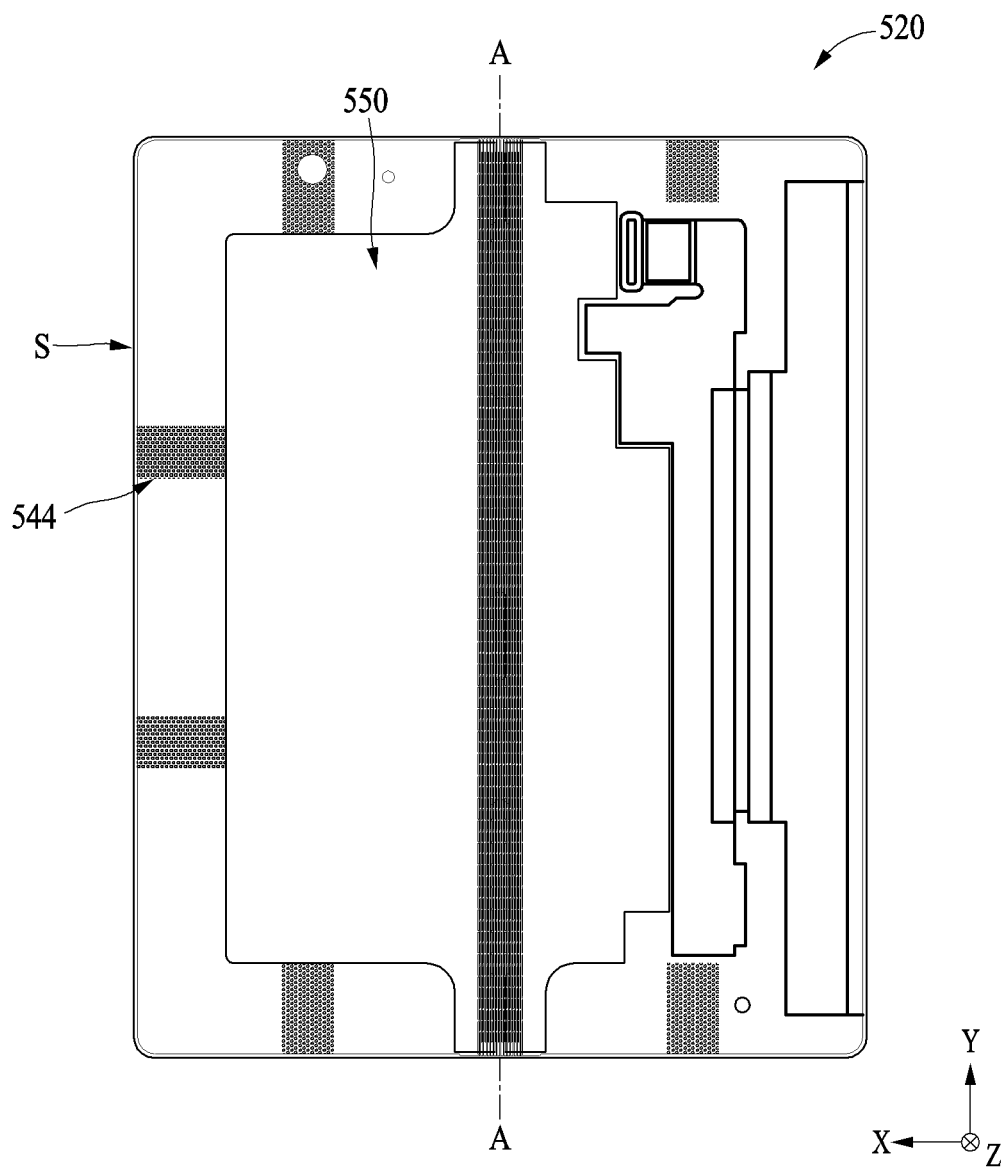
FIG. 5I is a diagram illustrating a rear surface of the display module of FIG. 5A in a state in which an adhesive member is not attached to the display module according to an example embodiment.

FIG. 5I is a diagram illustrating the rear surface of the display module of FIG. 5A in a state in which an adhesive member is not attached to the display module according to an example embodiment.

Referring to FIG. 5I, the opening structure 544 may be formed at a position that does not overlap the second plate 550. The opening structure 544 may extend inward from each of the outer sides S up to a position that does not overlap the second plate 550. The length of the opening structure 544 extending inward from each of the outer sides S may be less than or substantially equal to the width of the adhesive member (e.g., the adhesive member 560 of FIG. 5B). If the opening structure 544 overlaps the second plate 550, it may be difficult to sufficiently deform (e.g., stretch or compress) the opening structure 544 due to the rigidity of the second plate 550, thereby reducing the buffering effect of the opening structure 544. Accordingly, the opening structure 544 may be formed not to overlap the second plate 550. If second plates 550 are formed partially asymmetrically with respect to the folding axis A, opening structures 544 may also be formed asymmetrically in some positions.

Figure 6A:
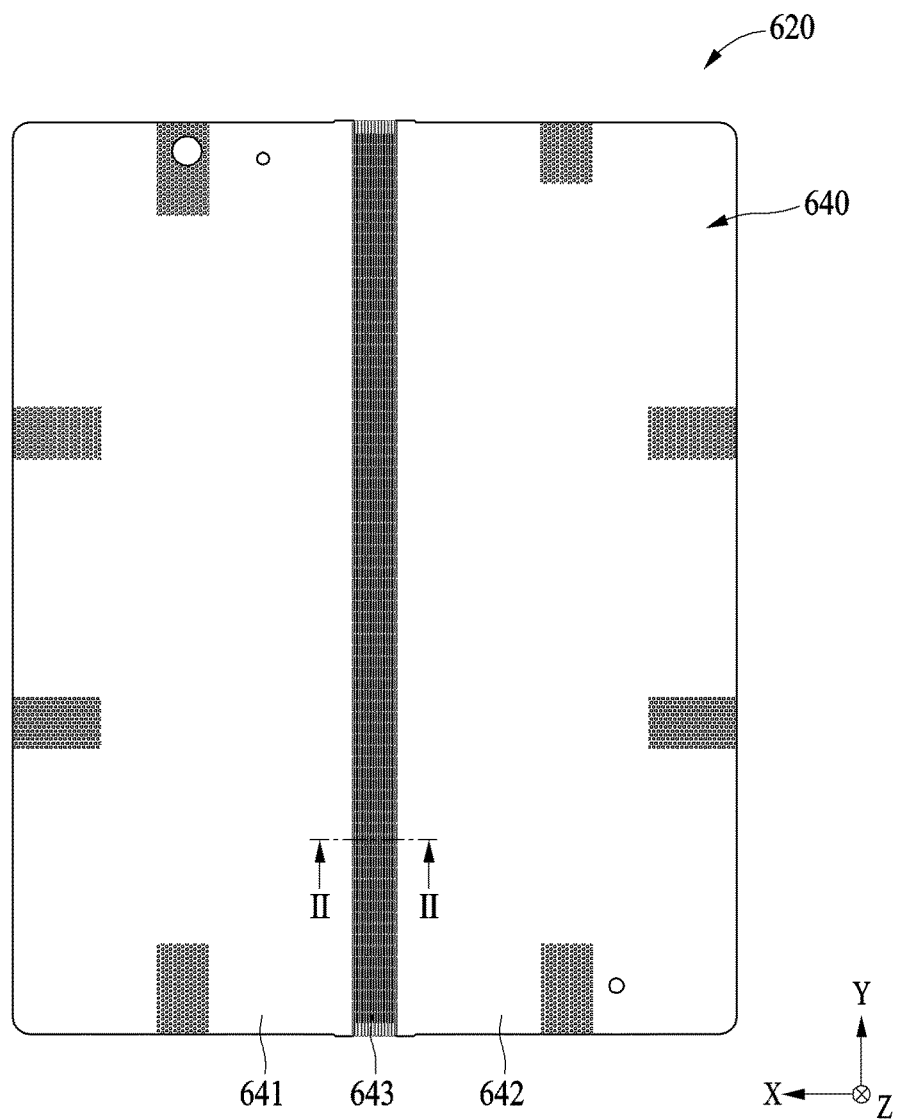
FIG. 6A is a diagram illustrating a rear surface of a display module in an unfolded state of the display module according to an example embodiment.
Figure 6B:
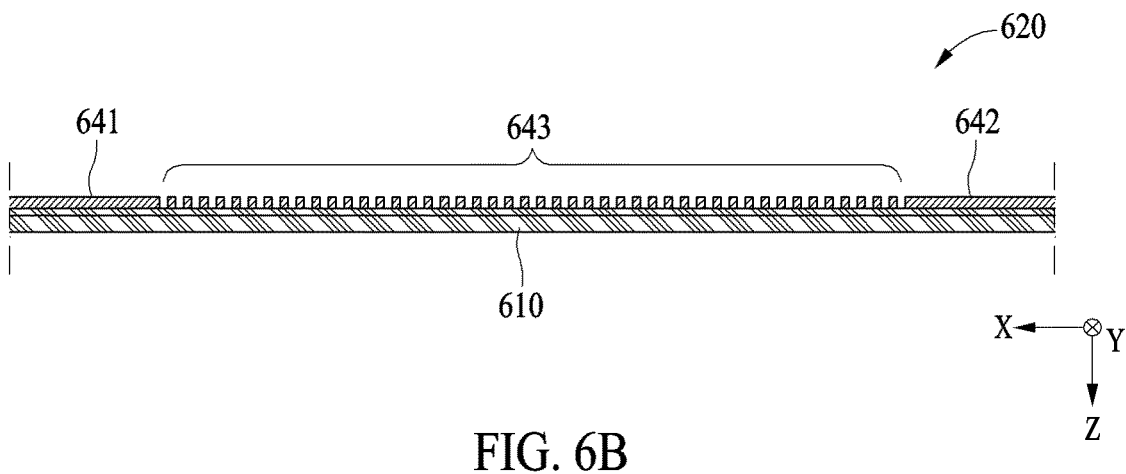
FIG. 6B is a cross-sectional view taken along line II-II of FIG. 6A.
Figure 6C:
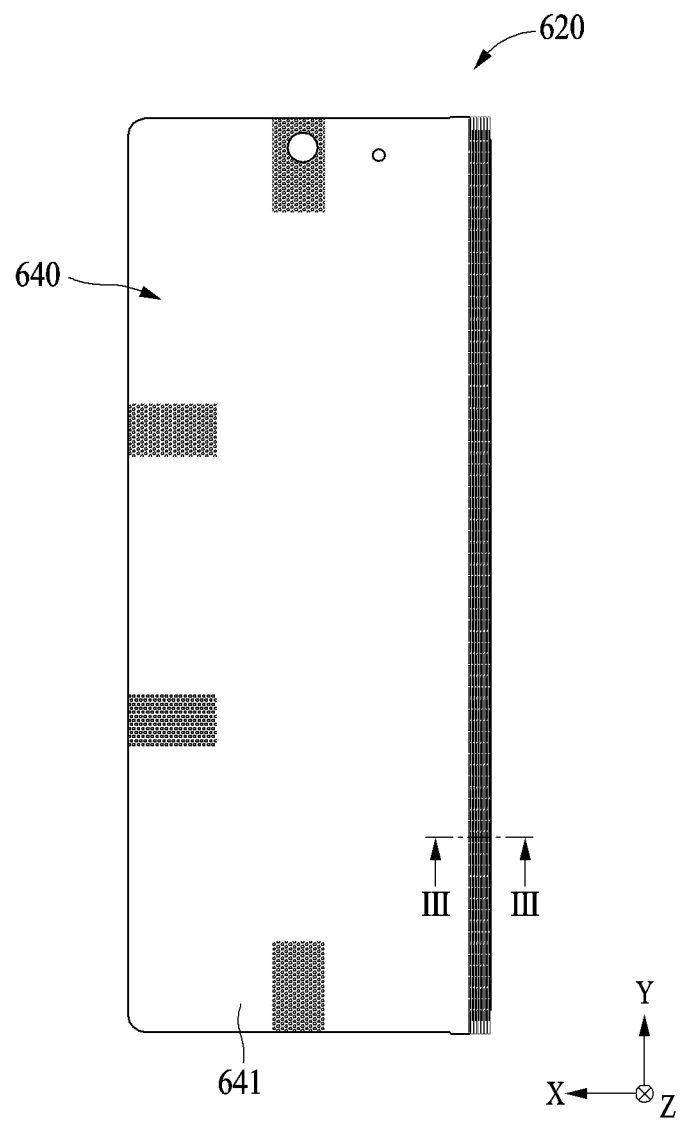
FIG. 6C is a diagram illustrating the rear surface of the display module of FIG. 6A in a folded state of the display module according to an example embodiment.
Figure 6D:
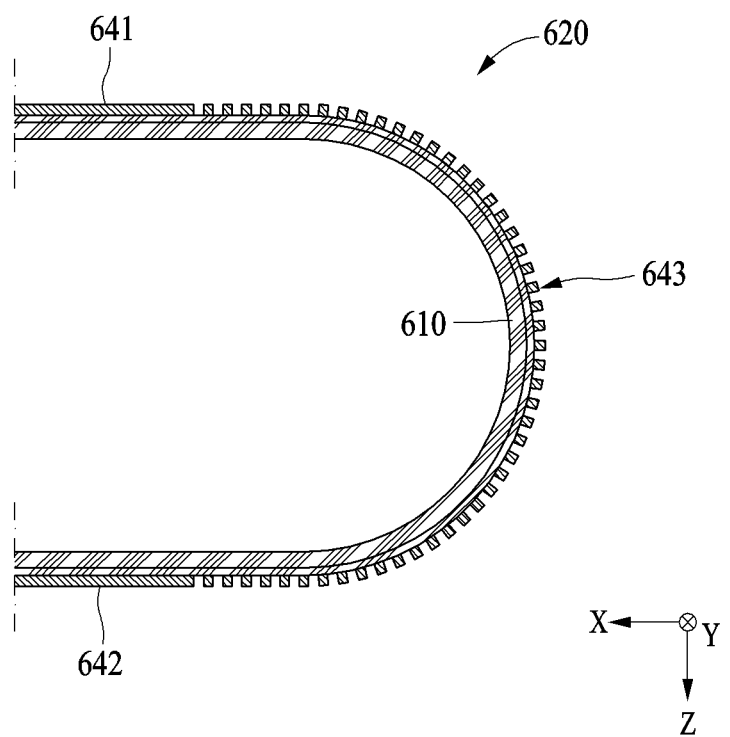
FIG. 6D is a cross-sectional view taken along line of FIG. 6C.

FIG. 6A is a diagram illustrating a rear surface of a display module in an unfolded state of the display module according to an example embodiment. FIG. 6B is a cross-sectional view taken along line II-II of FIG. 6A. FIG. 6C is a diagram illustrating the rear surface of the display module of FIG. 6A in a folded state of the display module according to an example embodiment. FIG. 6D is a cross-sectional view taken along line of FIG. 6C. For convenience of description, some components of the display module are not illustrated in FIGS. 6A to 6D.

Referring to FIGS. 6A to 6D, a display module 620 (e.g., the display module 320 of FIG. 3 or the display module 520 of FIGS. 5A to 5D) according to an example embodiment may be in an unfolded state or a folded state. A bendable portion 643 of a first plate 640 (e.g., the first plate 540 of FIG. 5F) may be bendably formed, thereby enabling the first plate 640 to be folded.

In an example embodiment, the bendable portion 643 may have a lattice structure to be bendable. For example, the bendable portion 643 may include a plurality of openings. The plurality of openings may be arranged in a lattice pattern. For example, the plurality of openings may be formed as slits having a longitudinal direction parallel to a folding axis A. However, the form of the plurality of openings is not limited thereto, and the openings may be formed in various ways. In addition, the structure of the bendable portion 643 is not limited thereto. In an example embodiment, the bendable portion 643 may include a plurality of recesses of a predetermined depth.

In an example embodiment, as shown in FIGS. 6A and 6B, when the display module 620 is in the unfolded state, the bendable portion 643 may be in a substantially flat state. A first planar portion 641, a second planar portion 642, and the bendable portion 643 may form substantially the same plane. When the display module 620 is in the folded state, as shown in FIGS. 6C and 6D, the bendable portion 643 may be bent. The first planar portion 641 and the second planar portion 642 may face each other as the bendable portion 643 bends.

Figure 7A:
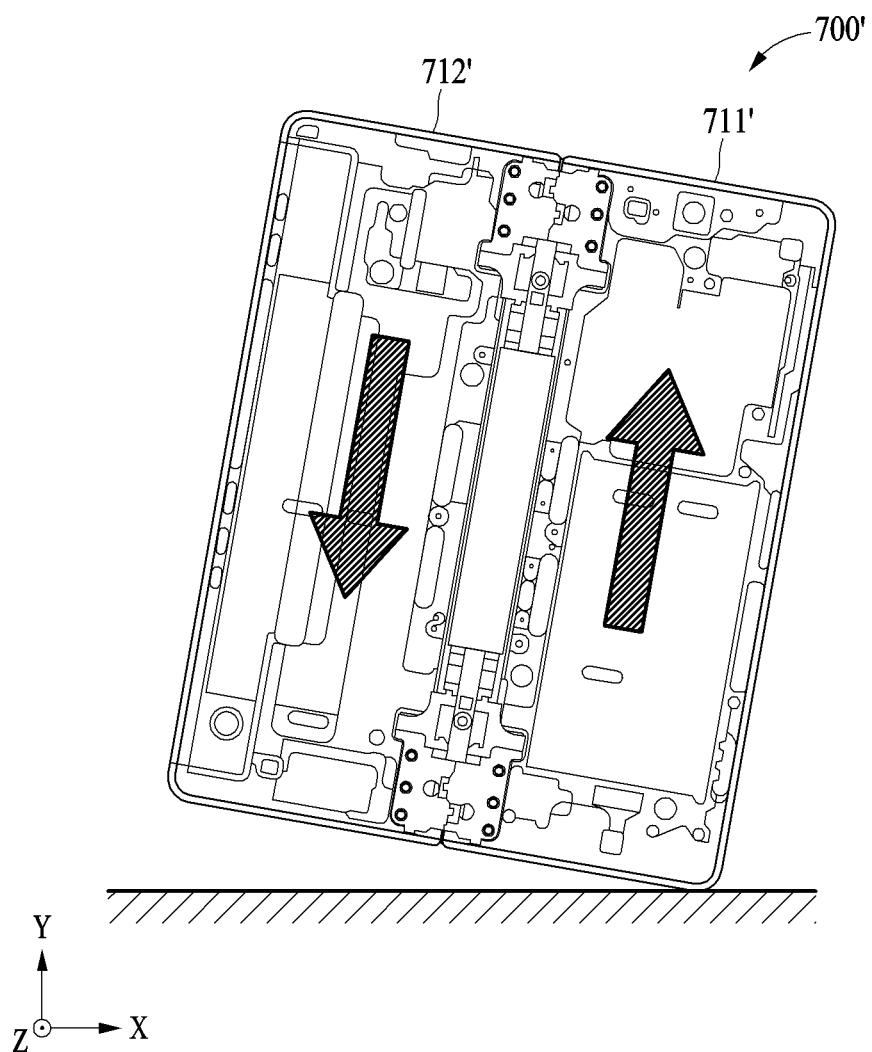
FIGS. 7A to 7C are diagrams illustrating a situation in which a conventional electronic device receives a drop impact.
Figure 7B:
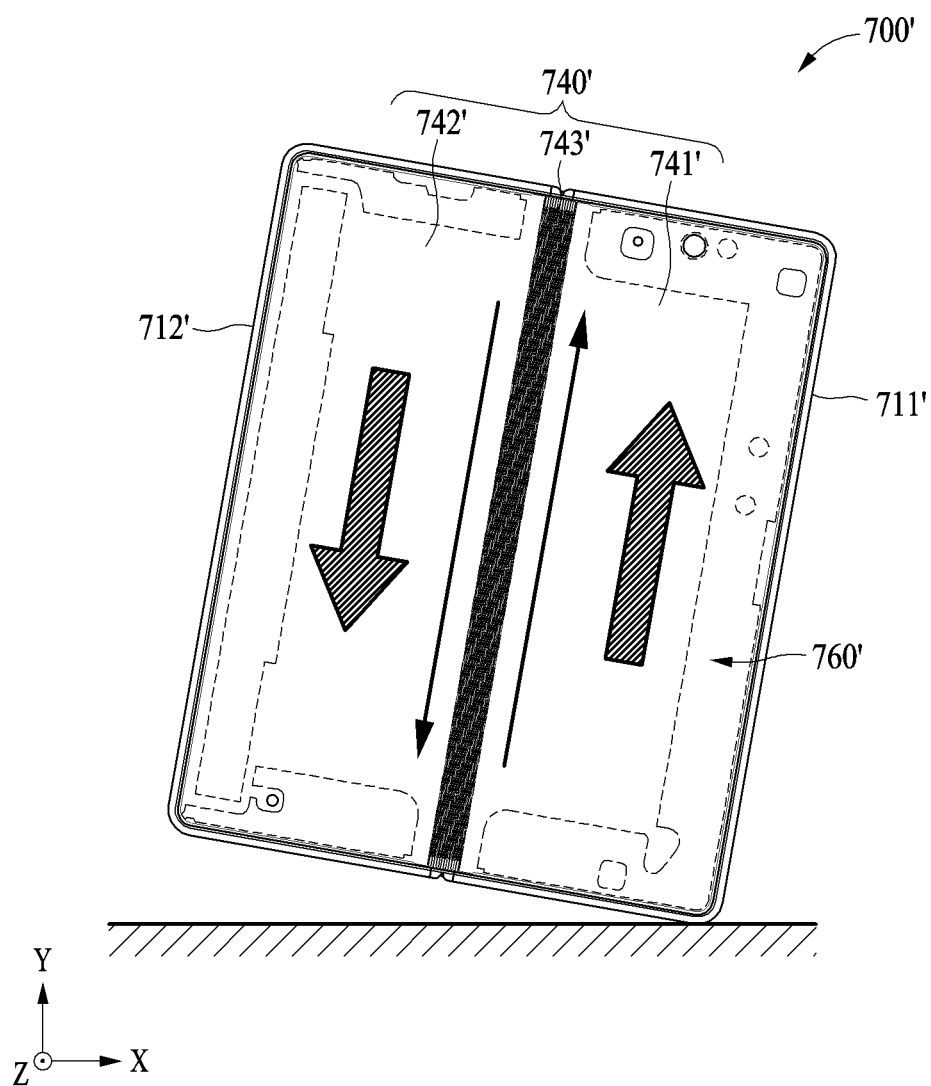
Figure 7C:
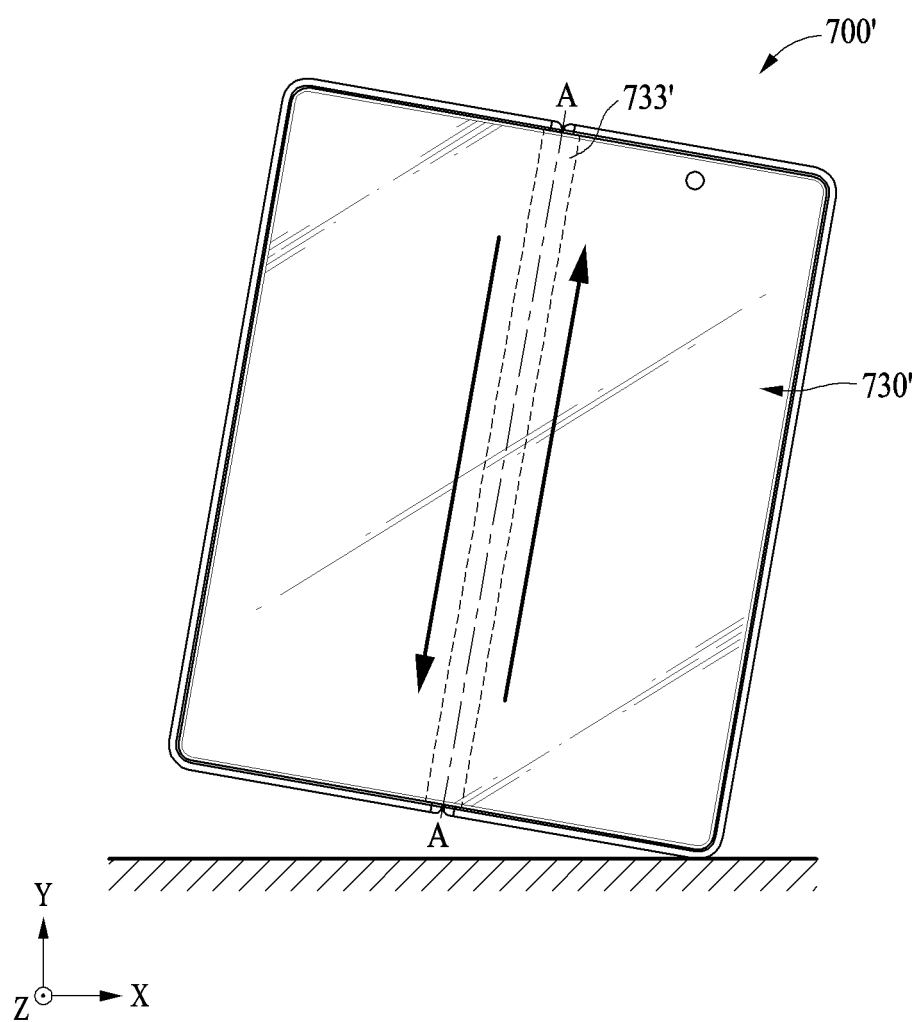

FIGS. 7A to 7C are diagrams illustrating a situation in which a conventional electronic device receives a drop impact. Here, the conventional electronic device 700' may be an electronic device in which an opening structure (e.g., the opening structure 544 of FIG. 5F) is not formed in a first plate 740'.

Referring to FIGS. 7A to 7C, when the conventional electronic device 700' falls and collides with the floor or ground, shear stress may be concentrated on a portion near the folding axis A of the electronic device 700'. For example, in the situation of FIG. 7A, a first housing structure 711' may receive an impact to be pushed upward (e.g., in the +Y-axis direction) due to a collision with the floor, and a second housing structure 712' may receive a force to be pushed downward (e.g., in the −Y-axis direction) due to the reaction thereof. In addition, referring to FIG. 7B, a first planar portion 741' and a second planar portion 742' of the first plate 740' may be attached to the first housing structure 711' and the second housing structure 712' by an adhesive member 760' disposed along outer sides, respectively, and accordingly the first planar portion 741' may move upward (e.g., in the +Y-axis direction) similarly to the first housing structure 711' and the second planar portion 742' may move downward (e.g., in the +Y-axis direction) similarly to the second housing structure 712'. Due to such movements, excessive shear stress may be generated in a bendable portion 743' that is not adhered to the first or second housing structures via the adhesive member 760'. The shear stress concentrated on the bendable portion 743' may be transferred to a third area 733' of a flexible display 730' as shown in FIG. 7C, which may cause the third area 733' to be damaged. As a result, to prevent damage of the flexible display 730', shear stress caused by external impacts may need to be prevented from being concentrated on a predetermined portion (e.g., a portion near the folding axis A).

Figure 8A:
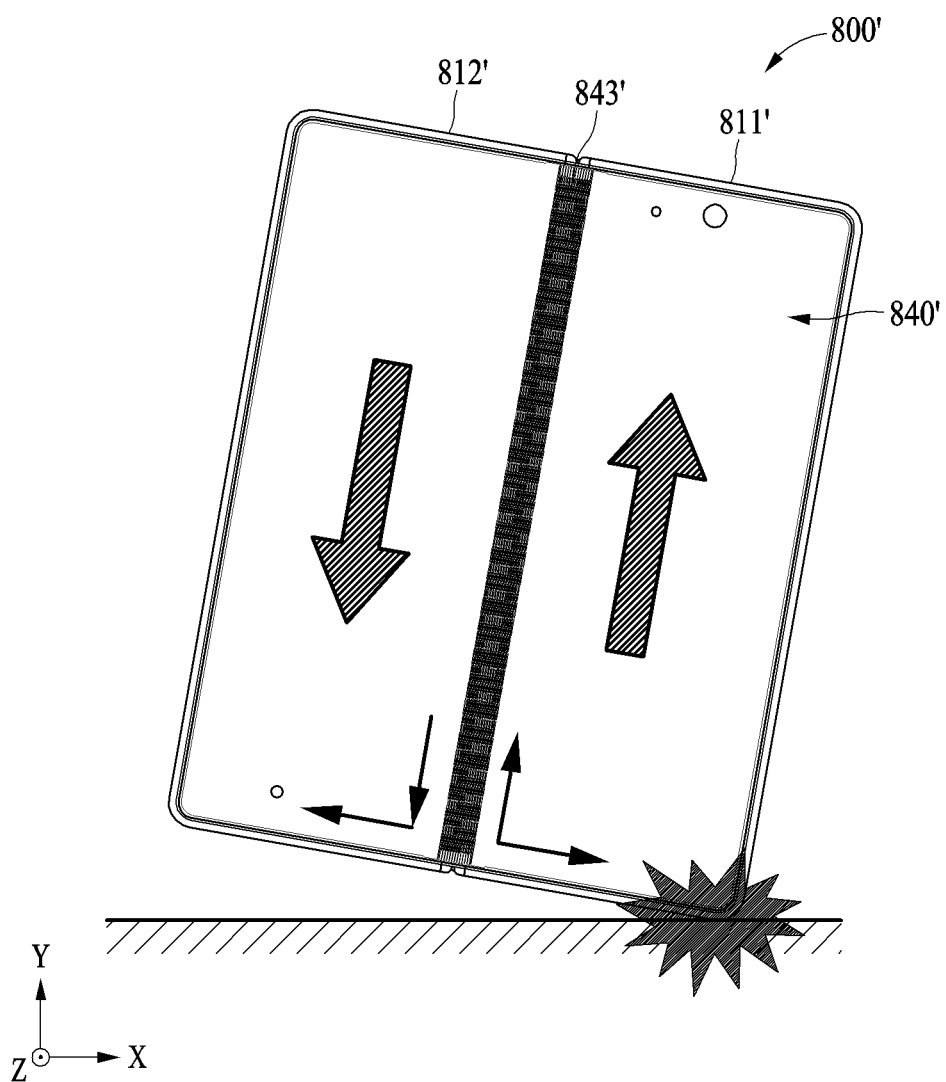
FIGS. 8A and 8B are diagrams illustrating situations in which a conventional electronic device and an electronic device according to an example embodiment receive drop impacts at one angle, respectively.
Figure 8B:
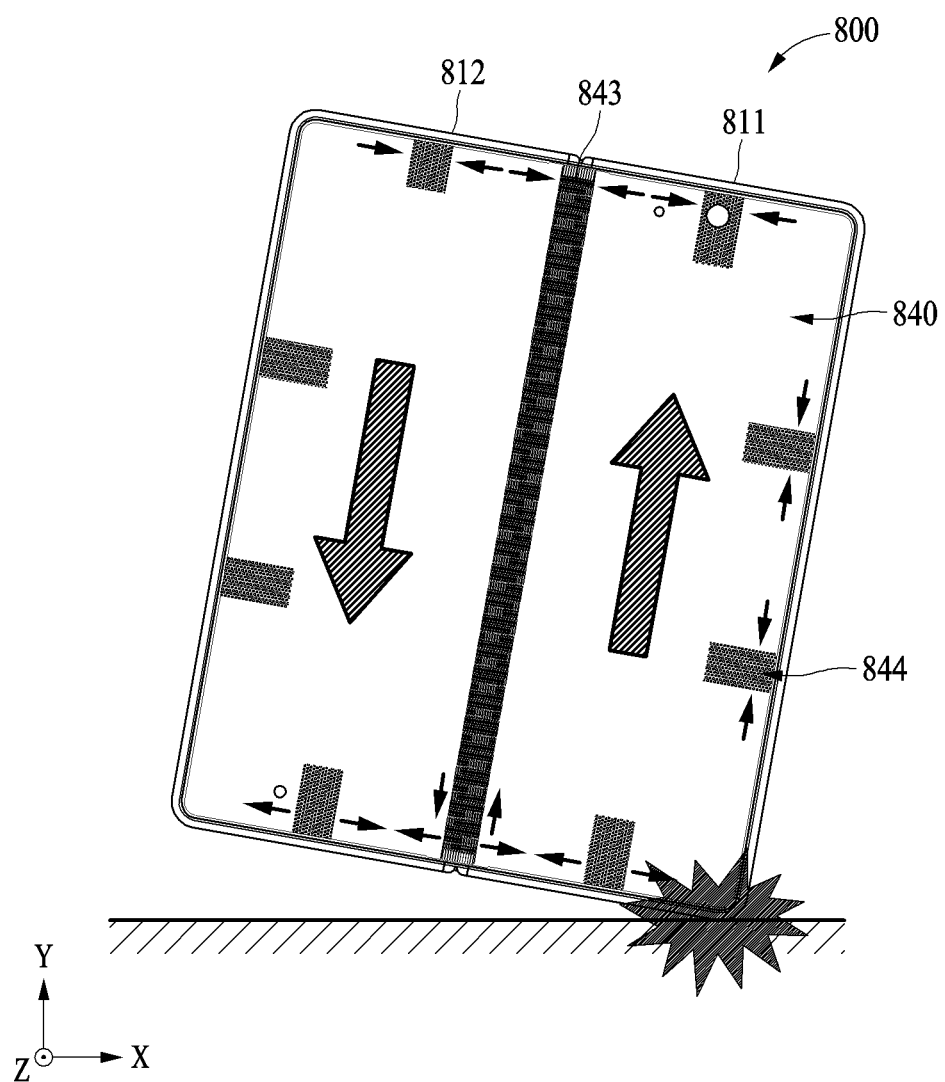
Figure 8C:
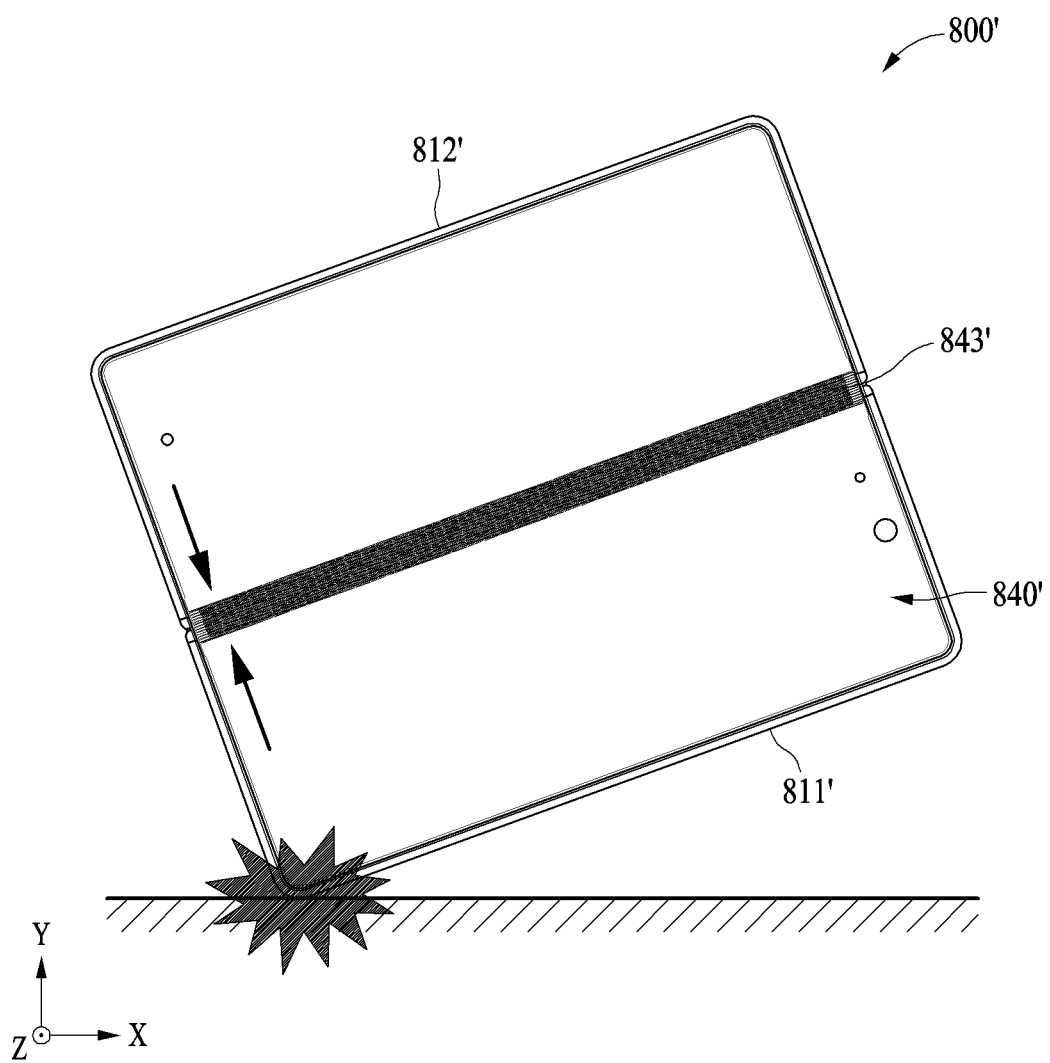
FIGS. 8C and 8D are diagrams illustrating situations in which a conventional electronic device and an electronic device according to an example embodiment receive drop impacts at another angle, respectively.
Figure 8D:
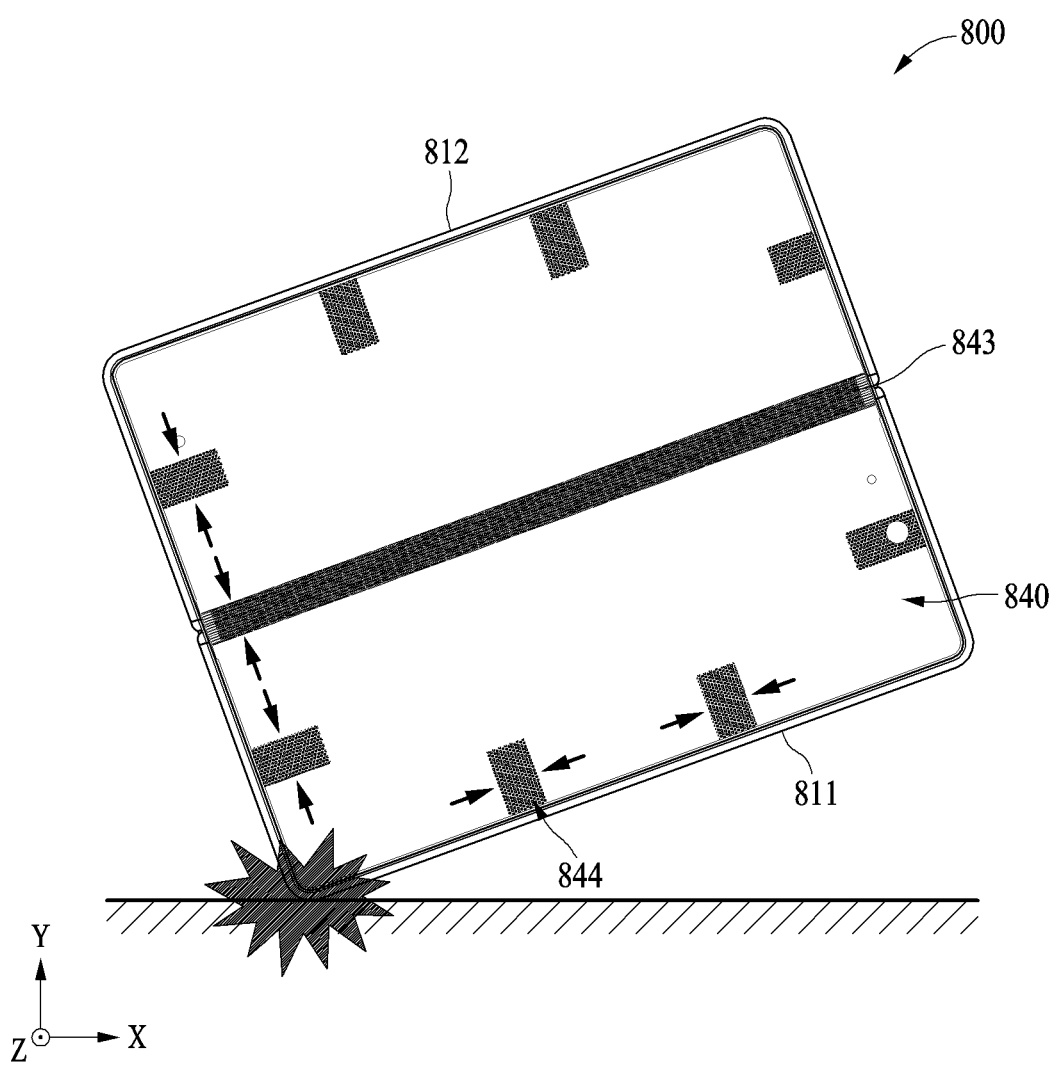

FIGS. 8A and 8B are diagrams illustrating situations in which a conventional electronic device and an electronic device according to an example embodiment receive drop impacts at one angle, respectively. FIGS. 8C and 8D are diagrams schematically illustrating situations in which a conventional electronic device and an electronic device according to an example embodiment receive drop impacts at another angle, respectively. Here, the conventional electronic device 800' may be an electronic device in which an opening structure (e.g., the opening structure 544 of FIG. 5F) is not formed in a first plate 840'.

Referring to FIGS. 8A and 8C, when the conventional electronic device 800' receives a drop impact at one angle, shear stress may be concentrated on a lower side of a bendable portion 843' of the first plate 840' due to shear movements of a first housing structure 811' and a second housing structure 812'. On the contrary, referring to FIGS. 8B and 8D, even though a drop impact occurs in an electronic device 800 (e.g., the electronic device 300 of FIG. 3) according to an example embodiment, opening structures 844 formed along outer sides of the first plate 840 may absorb and disperse the drop impact while being partially stretched or compressed. Due to such stretching or compressing of the opening structures 844, the drop impact may be evenly dispersed and absorbed along the outer sides of the first plate 840. Accordingly, concentration of shear stress on a bendable portion 843 may be prevented. As a result, the electronic device 800 according to the example embodiment may disperse and absorb external impacts using the opening structures 844, to prevent the shear stress from being concentrated on a predetermined portion (e.g., the bendable portion 843). Thus, it may be possible to prevent deformation of the first plate 840, a second plate (e.g., the second plate 550 of FIG. 5C), and a display (e.g., the display 530 of FIG. 5C). Therefore, the electronic device 800 may have enhanced display durability in comparison to the conventional electronic device 800'.

FIGS. 9A to 9D are diagrams illustrating examples of a rear surface of a first plate according to certain example embodiments. FIG. 9E is a graph illustrating an impact absorption improvement rate of the first plate of FIGS. 9A to 9D in comparison to a conventional example in which an opening structure is not formed.

Figure 9A:
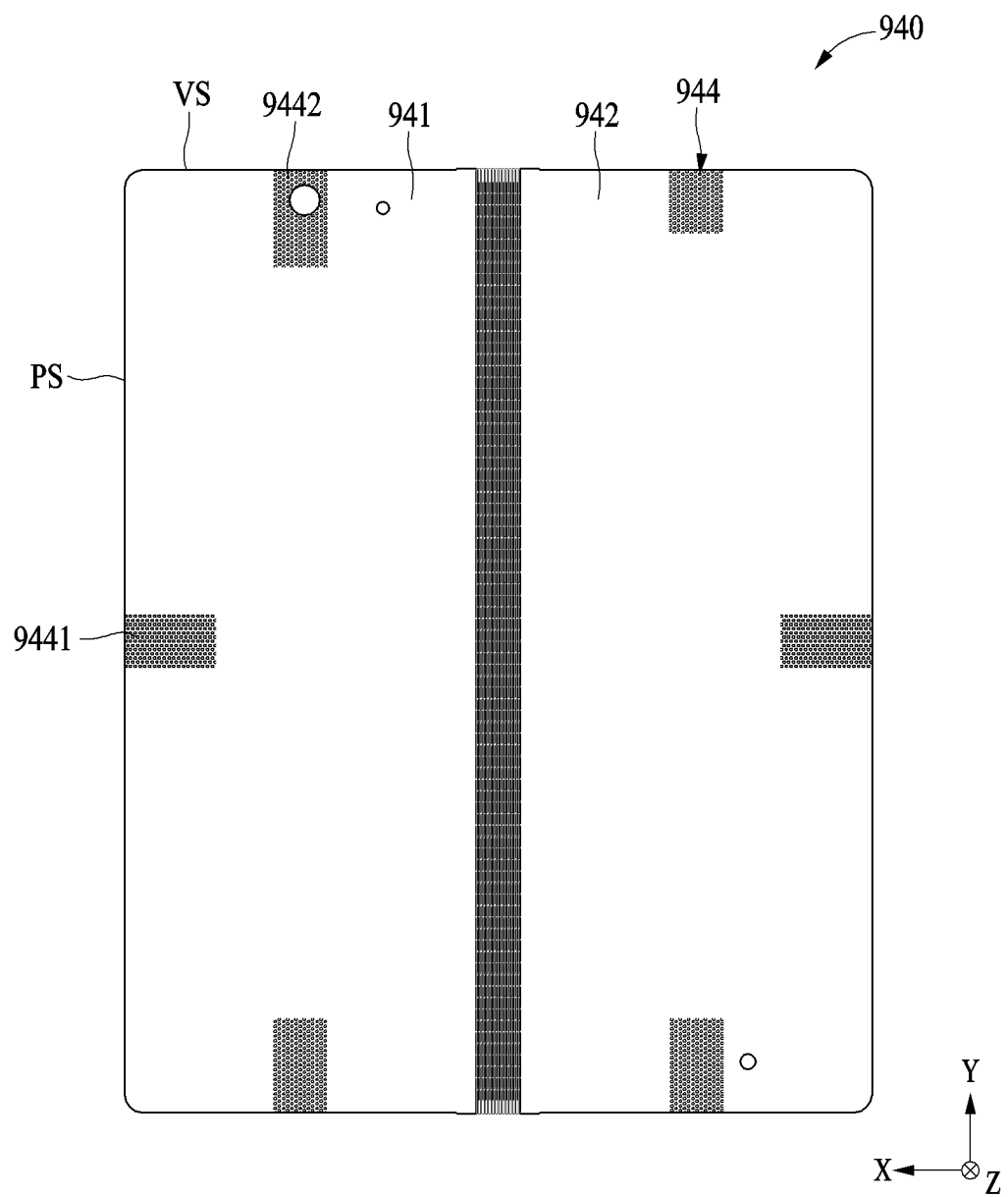
FIGS. 9A to 9D are diagrams illustrating examples of a rear surface of a first plate according to certain example embodiments.
Figure 9B:
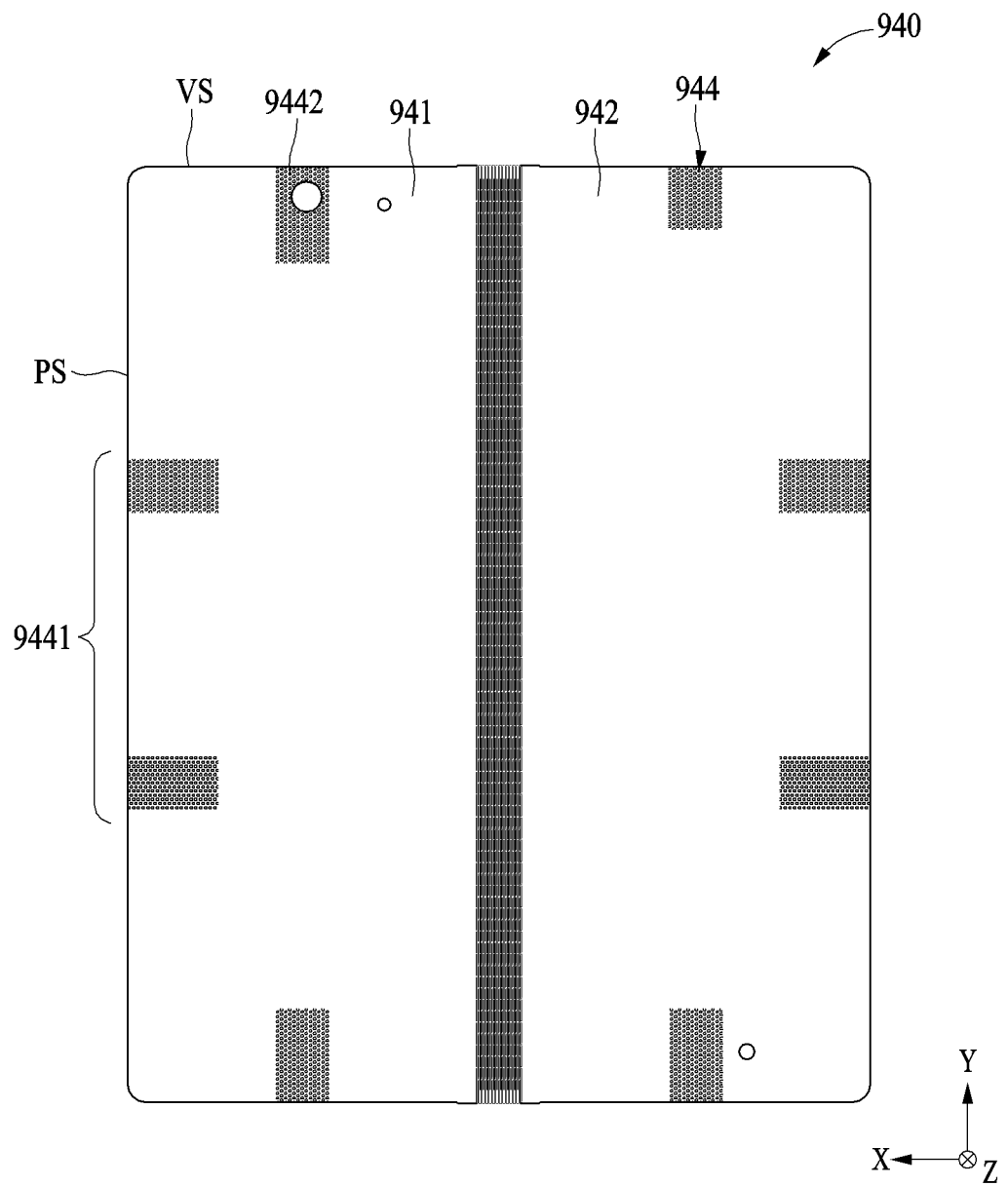
Figure 9C:
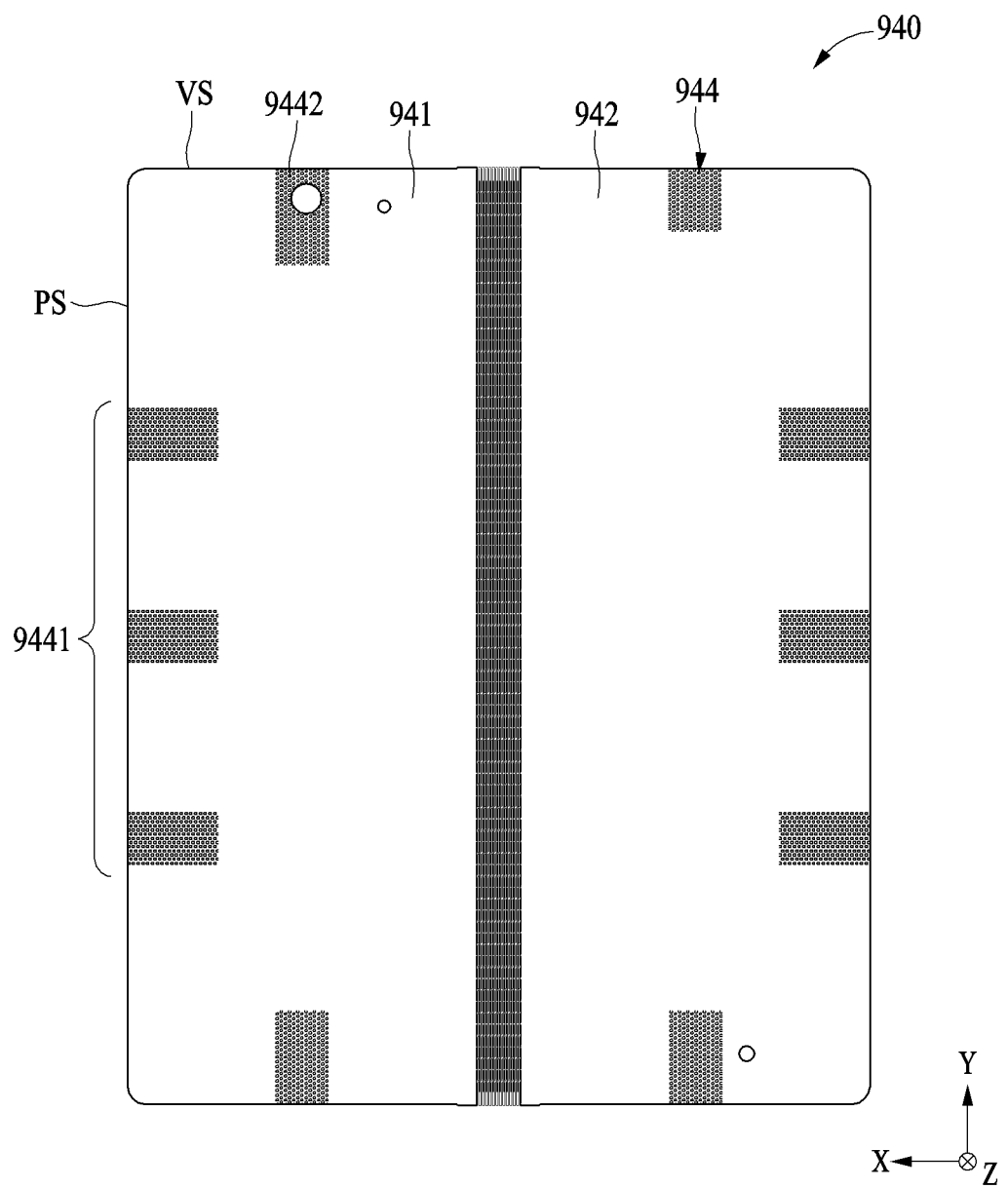
Figure 9D:
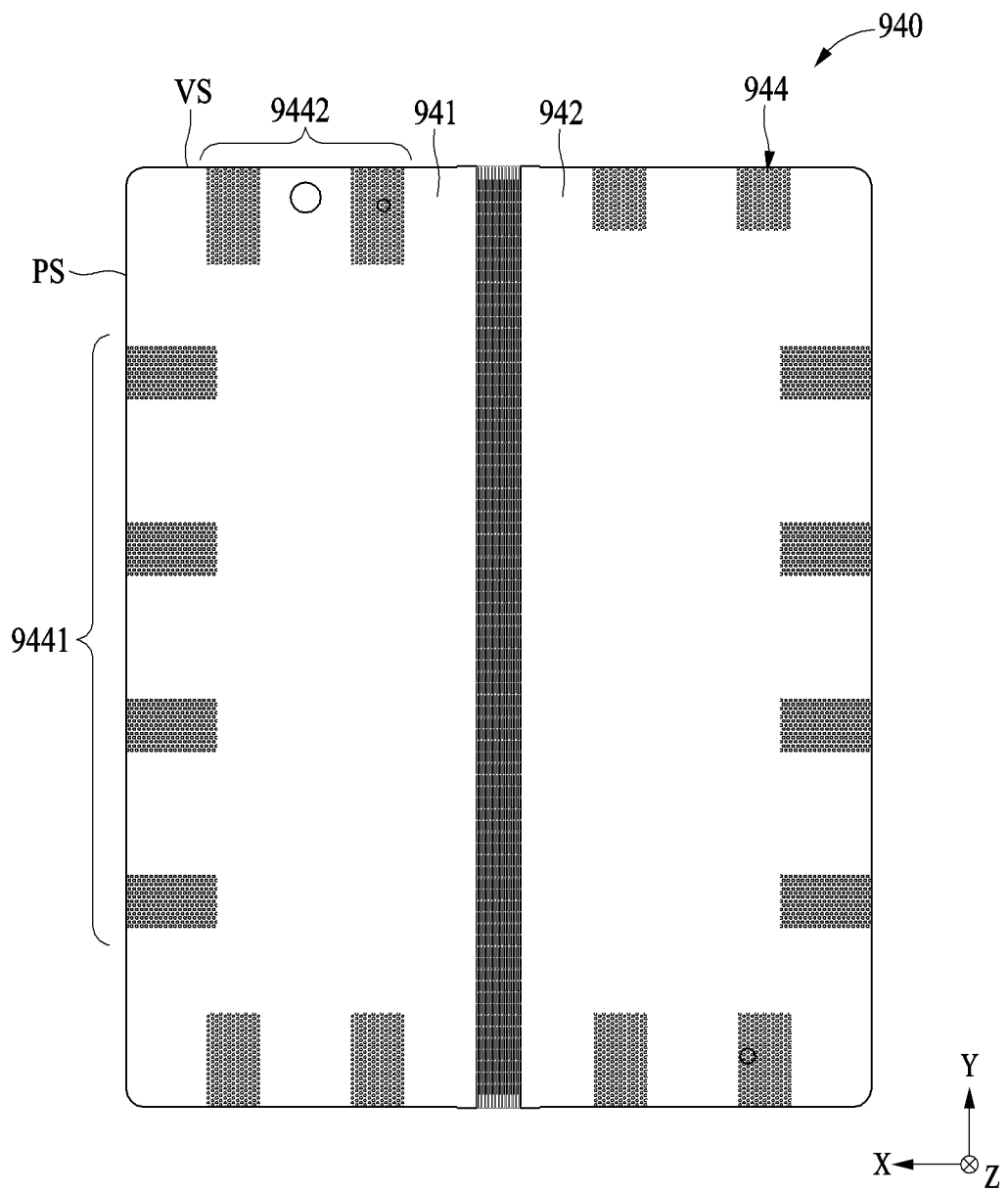
Figure 9E:
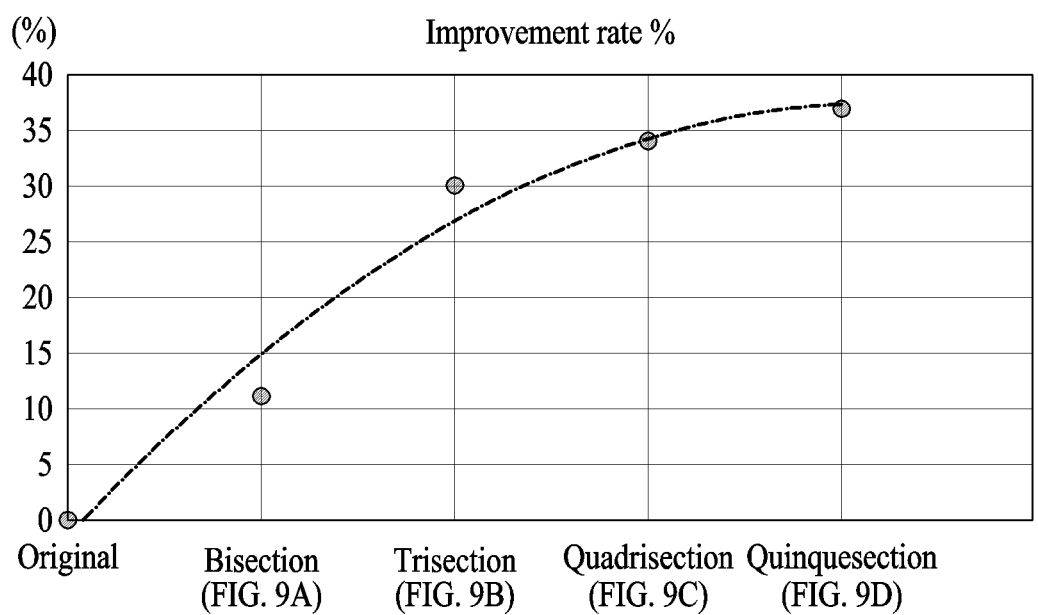
FIG. 9E is a graph illustrating an impact absorption improvement rate of the first plate of FIGS. 9A to 9D in comparison to a conventional example in which an opening structure is not formed.

Referring to FIGS. 9A to 9D, opening structures 944 may be formed in various positions of a first plate 940, and a number of opening structures 944 may vary. Referring to FIG. 9A, in an example embodiment, a first opening structure 9441 may be formed at a point by which a parallel side PS of each of a first planar portion 941 and a second planar portion 942 is divided into two parts (e.g., the point at which the parallel side is substantially bisected), and a second opening structure 9442 may be formed at a point by which a vertical side VS of each of the first planar portion 941 and the second planar portion 942 is divided into two parts (e.g., the point at which the vertical side is substantially bisected). Referring to FIG. 9B, in an example embodiment, a first opening structure 9441 may be formed at a point by which a parallel side PS of each of the first planar portion 941 and the second planar portion 942 is divided into three parts (e.g., the points at which the parallel side is substantially trisected), and a second opening structure 9442 may be formed at a point by which a vertical side VS of each of the first planar portion 941 and the second planar portion 942 is divided into two parts (e.g., the point at which the vertical side is substantially bisected). Referring to FIG. 9C, in an example embodiment, a first opening structure 9441 may be formed at a point by which a parallel side PS of each of the first planar portion 941 and the second planar portion 942 is divided into four parts (e.g., the points at which the parallel side is substantially quadrisected), and a second opening structure 9442 may be formed at a point by which a vertical side VS of each of the first planar portion 941 and the second planar portion 942 is divided into two parts (e.g., the point at which the vertical side is substantially bisected). Referring to FIG. 9D, in an example embodiment, a first opening structure 9441 may be formed at a point by which a parallel side PS of each of the first planar portion 941 and the second planar portion 942 is divided into five parts (e.g., the points at which the parallel side is substantially quinquesected), and a second opening structure 9442 may be formed at a point by which a vertical side VS of each of the first planar portion 941 and the second planar portion 942 is divided into three parts (e.g., the points at which the vertical side is substantially trisected). However, positions and a number of first opening structures 9441 and positions and a number of second opening structures 9442 are not limited thereto. The first opening structures 9441 and the second opening structures 9442 may be formed in various positions of the first plate 940, and the numbers of first opening structures 9441 and second opening structures 9442 may vary. For example, the first opening structures 9441 and the second opening structures 9442 may be formed in designated positions at regular intervals or at irregular intervals.

Referring to FIG. 9E, it may be confirmed that the impact absorption improvement rate increases, as the number of opening structures (e.g., the opening structures 944 of FIGS. 9A to 9D) increases. The number of opening structures 944 may be determined by additionally taking into consideration other qualities of the surfaces of the first plate 940 (e.g., durability and/or rigidity).

Figure 10:
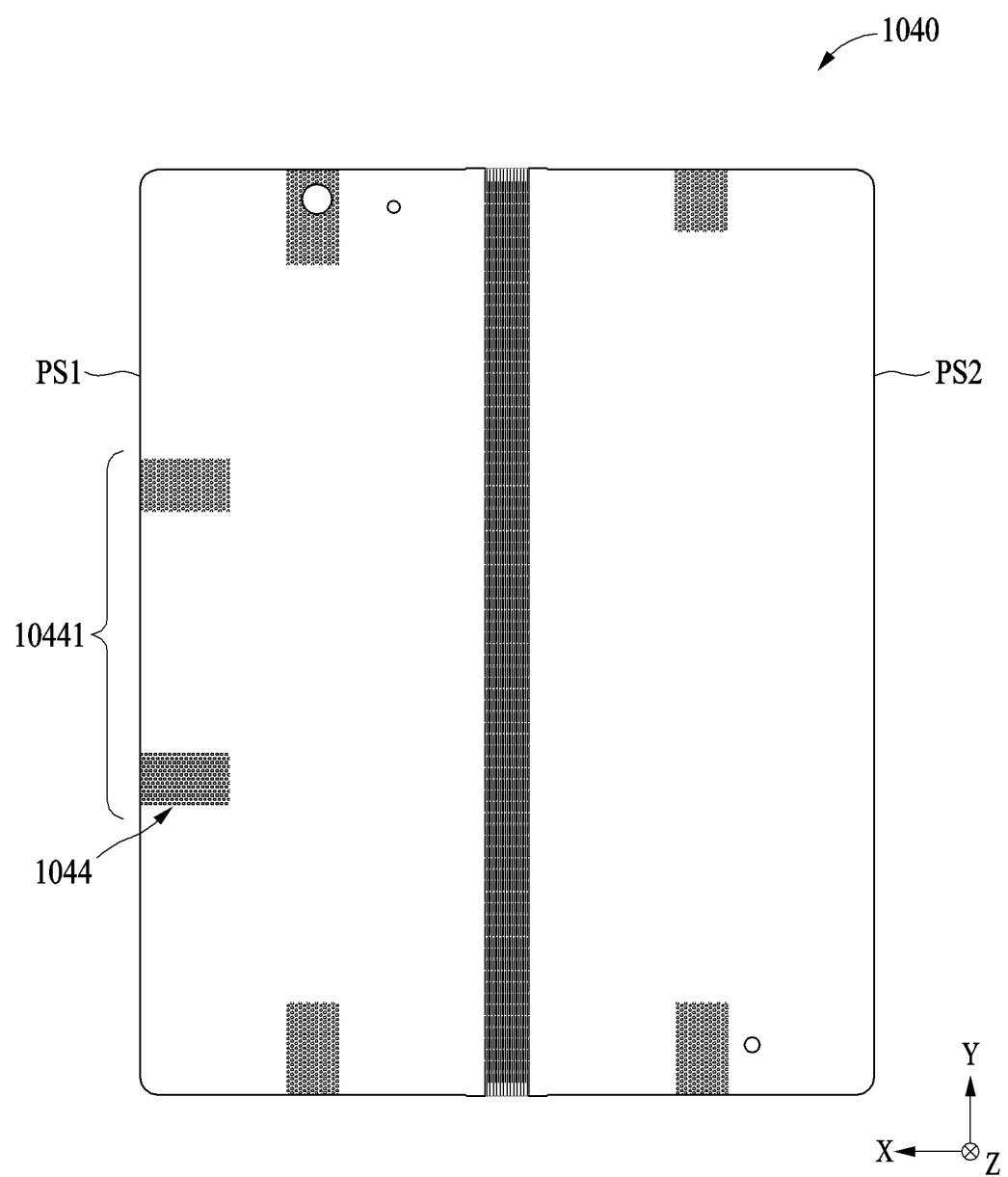
FIG. 10 is a diagram illustrating a rear surface of a first plate according to an example embodiment.

FIG. 10 is a diagram illustrating a rear surface of a first plate according to an example embodiment.

Referring to FIG. 10, in a first plate 1040 (e.g., the first plate 540 of FIGS. 5C and 5F) according to an example embodiment, an opening structure 1044 (e.g., the opening structure 544 of FIG. 5F) may not be formed in a position overlapping a PCB (e.g., the PCB 570 of FIGS. 5C and 5H). For example, the opening structure 1044 may be formed in a position that does not overlap the PCB 570. For example, a first opening structure 10441 may be formed on a parallel side PS1 on which the PCB 570 is not disposed, and may not be formed on a parallel side PS2 on which the PCB 570 is disposed. If the opening structure 1044 is formed in an area in which the PCB 570 is disposed, the PCB 570 may be damaged due to stretching or compressing of the opening structure 1044. Accordingly, the opening structure 1044 may not be formed in the area in which the PCB 570 is disposed.

Figure 11:
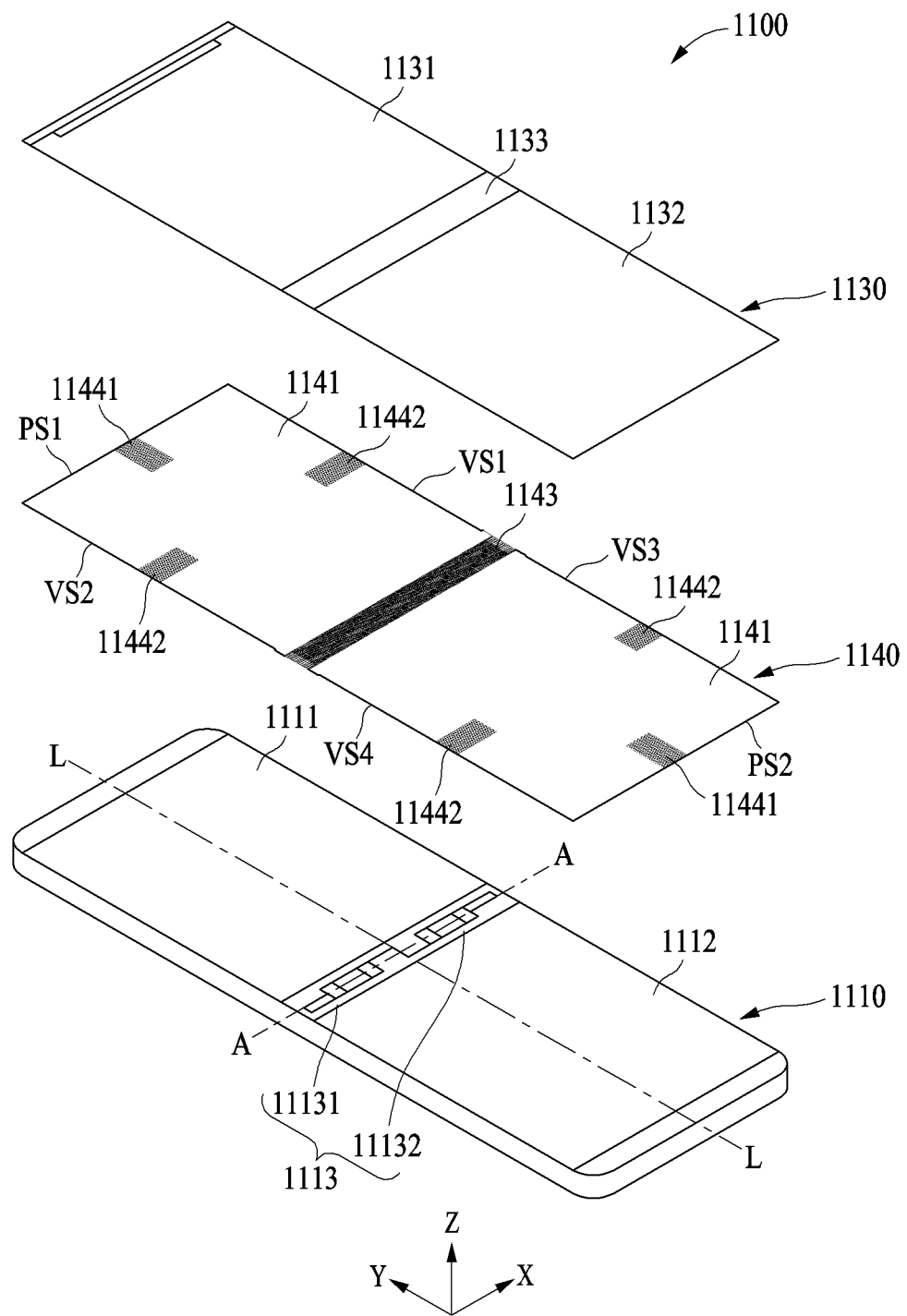
FIG. 11 is an exploded perspective view schematically illustrating an electronic device according to an example embodiment.

FIG. 11 is an exploded perspective view schematically illustrating an electronic device according to an example embodiment.

Referring to FIG. 11, an electronic device 1100 (e.g., the electronic device 101 of FIG. 1 or the electronic device 200 of FIGS. 2A to 2C) according to an example embodiment may include a housing 1110, a first plate 1140, and a flexible display 1130.

In an example embodiment, the electronic device 1100 may be unfolded or folded about a folding axis A. The folding axis A may be parallel to the X-axis direction that is parallel to the short side of the electronic device. The above-described opening structure (e.g., the opening structure 544 of FIG. 5F) may be similarly applied to an example in which the electronic device 1100 is folded along its short side, as shown in FIG. 11.

In an example embodiment, the housing 1110 may include a first housing structure 1111, a second housing structure 1112, and a hinge structure 1113. The first housing structure 1111 and the second housing structure 1112 may be rotatably connected to each other by the hinge structure 1113. The hinge structure 1113 may include a first hinge structure 11131 and a second hinge structure 11132. For example, the first hinge structure 11131 may be disposed on one side (e.g., the left side shown on FIG. 11) of the first housing structure 1111 and the second housing structure 1112, and the second hinge structure 11132 may be disposed on the other side (e.g., the right side shown on FIG. 11) of the first housing structure 1111 and the second housing structure 1112. Inner end portions of the first hinge structure 11131 and the second hinge structure 11132 may substantially contact each other.

In an example embodiment, the flexible display 1130 may display visual information on a front surface (e.g., the +Z-axis directional surface). The flexible display 1130 may be folded or unfolded about the folding axis A. The flexible display 1130 may include a first area 1131, a second area 1132, and a third area 1133. The first area 1131 may be an area facing the first housing structure 1111. The second area 1132 may be an area facing the second housing structure 1112.

In an example embodiment, the first plate 1140 may be disposed between the housing 1110 and the flexible display 1130. The first plate 1140 may include a first planar portion 1141, a second planar portion 1142, a bendable portion 1143, and an opening structure 1144. The first planar portion 1141 may face the first area 1131 of the flexible display 1130. The second planar portion 1142 may face the second area 1132 of the flexible display 1130. The bendable portion 1143 may connect the first planar portion 1141 and the second planar portion 1142 and may be bendable.

In an example embodiment, the opening structure 1144 may reduce impacts upon the first plate 1140. With the opening structure 1144, the first plate 1140 may be at least partially stretchable or compressible by external impacts. One or more opening structures 1144 may be formed at designated positions on outer sides of at least one of the first planar portion 1141 and the second planar portion 1142.

In an example embodiment, the opening structure 1144 may include a first opening structure 11441 and a second opening structure 11442.

In an example embodiment, the first opening structure 11441 may be formed on at least one of a parallel side PS1 of the first planar portion 1141 and a parallel side PS2 of the second planar portion 1142. For example, one or more first opening structures 11441 may be formed on each of the parallel side PS1 of the first planar portion 1141 and the parallel side PS2 of the second planar portion 1142.

In an example embodiment, the first opening structure 11441 may be formed at a point where the parallel side PS1 or PS2 meets an imaginary extension line L extending in a direction perpendicular to the folding axis A from the inner end portions of the first hinge structure 11131 and the second hinge structure 11132. For example, when the inner end portions of the first hinge structure 11131 and the second hinge structure 11132 are substantially in contact with each other, each first opening structure 11441 may be formed at a point where each of the parallel sides PS1 and PS1 meets the imaginary extension line L. However, this is merely an example, and the position of the first opening structure 11441 is not limited thereto.

In an example embodiment, the second opening structure 11442 may be formed on at least one of vertical sides VS1, VS2, VS3, and VS4 of the first planar portion 1141 and the second planar portion 1142. For example, one or more second opening structures 11442 may be formed on each of the vertical sides VS1 and VS2 of the first planar portion 1141 and the vertical sides VS3 and VS4 of the second planar portion 1142.

In an example embodiment, the second opening structure 11442 may be formed at a point by which the vertical side VS1, VS2, VS3, or VS4 is divided into two parts. For example, the second opening structure 11442 may be formed at a point by which the vertical side VS1, VS2, VS3, or VS4 is substantially bisected. However, this is merely an example, and the position of the second opening structure 11442 is not limited thereto.

In an example embodiment, the electronic device 300 may include: the housing 410 including the first housing structure 411 and the second housing structure 412 that are rotatably connected to each other by the hinge structure 413; the flexible display 530 including the first area 531 facing the first housing structure 411, the second area 532 facing the second housing structure 412, and the third area 533 connecting the first area 531 and the second area 532; and the first plate 540 disposed between the housing 410 and the flexible display 530 and configured to support the flexible display 530. The first plate 540 may include the first planar portion 541 facing the first area 531, the second planar portion 542 facing the second area 532, and the bendable portion 543 that connects the first planar portion 541 and the second planar portion 542. The first plate 540 may further include at least one opening structure 544 formed at a designated position on the outer sides S of at least one of the first planar portion 541 and the second planar portion 542 to be at least partially stretchable or compressible when an external impact is incident upon it.

In an example embodiment, the opening structure 544 may include the first opening structure 5441 formed on at least one of the parallel sides PS1 and PS2 that are sides parallel to the folding axis A of the hinge structure 413 in the outer sides S of the first planar portion 541 and the second planar portion 542.

In an example embodiment, the first opening structure 5441 may be formed at points at which the parallel side PS1 or PS2 is divided into three parts.

In an example embodiment, the first opening structure 5441 may be formed at points where the parallel side PS1 or PS2 meets an imaginary extension line L1 or L2 extending in a direction perpendicular to the folding axis A from an inner end portion of the hinge structure 413.

In an example embodiment, the opening structure 544 may include the second opening structure 5442 formed on at least one of the vertical sides VS1, VS2, VS3, and VS4 that are sides perpendicular to the folding axis A of the hinge structure 413 in the outer sides S of the first planar portion 541 and the second planar portion 542.

In an example embodiment, the second opening structure 5442 may be formed at points at which the vertical side VS1, VS2, VS3, or VS4 is divided into two parts.

In an example embodiment, the opening structure 544 may extend inward from each of the outer sides S.

In an example embodiment, the opening structure 544 may extend inward from each of the outer sides S at a constant width.

In an example embodiment, the opening structure 544 may extend inward from each of the outer sides S such that the width decreases toward the inside of the electronic device.

In an example embodiment, a length of the opening structure 544 extending inward from each of the outer sides S may be less than or equal to a width of the adhesive member 560 that is disposed along at least a portion of the outer sides S of the first plate 540 to attach the first plate 540 to the housing 410.

In an example embodiment, the opening structure 544 may be formed in a pattern in which hexagonal-shaped or diamond-shaped openings are repeatedly arranged.

In an example embodiment, opening structures 544 may be formed symmetrically with respect to the folding axis A of the hinge structure 413.

In an example embodiment, the electronic device 300 may further include the adhesive member 560 disposed along at least a portion of the outer sides S of the first plate 540 such that the first plate 540 is attached to the housing 410; and the second plate 550 disposed between the first plate 540 and the housing 410 so as not avoid overlapping the adhesive member 560 and configured to support the first plate 540.

In an example embodiment, the opening structure 544 may be formed at a position so as to avoid overlapping the second plate 550.

In an example embodiment, the electronic device 300 may further include the PCB 570 disposed on one side of the first plate 540, and the opening structure 544 may be formed at a position so as to avoid overlapping the PCB 570.

In an example embodiment, the electronic device 300 may include: the flexible display 530 including the first area 531, the second area 532, and the third area 533 connecting the first area 531 and the second area 532; and the first plate 540 disposed on the rear surface of the flexible display 530 and configured to support the flexible display 530. The first plate 540 may include the first planar portion 541 facing the first area 531, the second planar portion 542 facing the second area 532, and the bendable portion 543 that connects the first planar portion 541 and the second planar portion 542. The first plate 540 may further include at least one opening structure 544 formed at a designated position on the outer sides S of at least one of the first planar portion 541 and the second planar portion 542 to be at least partially stretchable or compressible when an external impact is incident upon it.

In an example embodiment, the opening structure 544 may include the first opening structure 5441 formed on at least one of the parallel sides PS1 and PS2 that are sides parallel to the folding axis A in the outer sides S of the first planar portion 541 and the second planar portion 542. The first opening structure 5441 may be formed at points at which the parallel side PS1 or PS2 is divided into three parts.

In an example embodiment, the opening structure 544 may include the second opening structure 5442 formed on at least one of the vertical sides VS1, VS2, VS3, and VS4 that are sides perpendicular to the folding axis A in the outer sides S of the first planar portion 541 and the second planar portion 542. The second opening structure 5442 may be formed at points at which the vertical side VS1, VS2, VS3, or VS4 is divided into two parts.

In an example embodiment, the electronic device 300 may further include the adhesive member 560 disposed along at least a portion of the outer sides S of the first plate 540 such that the first plate 540 is attached to the housing 410; and the second plate 550 disposed between the first plate 540 and the housing 410 so as to avoid overlapping the adhesive member 560 and configured to support the first plate 540. The opening structure 544 may be formed at a position so as to avoid overlapping the second plate 550.

In an example embodiment, the electronic device 300 may include: the housing 410 including the first housing structure 411 and the second housing structure 412 that are rotatably connected to each other by the hinge structure 413; the flexible display 530 including the first area 531 facing the first housing structure 411, the second area 532 facing the second housing structure 412, and the third area 533 connecting the first area 531 and the second area 532; and the first plate 540 disposed between the housing 410 and the flexible display 530 and configured to support the flexible display 530. The first plate 540 may include the first planar portion 541 facing the first area 531, the second planar portion 542 facing the second area 532, and the bendable portion 543 that connects the first planar portion 541 and the second planar portion 542. The first plate 540 may further include at least one opening structure 544 formed at a designated position on the outer sides S of at least one of the first planar portion 541 and the second planar portion 542 to be at least partially stretchable or compressible when an external impact is incident upon it. The opening structure 544 may include the first opening structure 5441 formed on at least one of the parallel sides PS1 and PS2 that are sides parallel to the folding axis A of the hinge structure 413 in the outer sides S of the first planar portion 541 and the second planar portion 542, and the second opening structure 5442 formed on at least one of the vertical sides VS1, VS2, VS3, and VS4 that are sides perpendicular to the folding axis A in the outer sides S of the first planar portion 541 and the second planar portion 542. The first opening structure 5441 may be formed at points where the parallel side PS1 or PS2 meets the imaginary extension line L1 or L2 extending in a direction perpendicular to the folding axis A from the inner end portion of the hinge structure 413, and the second opening structure 5442 may be formed at points at which the vertical side VS1, VS2, VS3, or VS4 is divided into two parts.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a housing including a first housing structure and a second housing structure that are rotatably connected to each other by a hinge structure;
a flexible display including a first area facing the first housing structure, a second area facing the second housing structure, and a third area connecting the first area and the second area; and
a first plate disposed between the housing and the flexible display and configured to support the flexible display,
wherein the first plate includes a first planar portion facing the first area, a second planar portion facing the second area, and a bendable portion that connects the first planar portion and the second planar portion,
wherein the first plate further includes at least one opening structure formed at a designated position on at least one of a plurality of edges of the first planar portion and/or at least one of a plurality of outer edges of the second planar portion,
wherein each of the at least one opening structure is formed on only one of the plurality of edges of the first planar portion and/or the second planar portion, and
wherein each of the at least one opening structure is formed in a pattern in which polygonal-shaped openings are repeatedly arranged and is configured to deform,
wherein the at least one opening structure extends inward from at least one of the plurality of outer edges,
wherein a length of the at least one opening structure extending inward from at least one of the plurality of outer edges is less than or equal to a width of an adhesive member that is disposed along at least a portion of the plurality of outer edges of the first plate to attach the first plate to the housing.

2. The electronic device of claim 1, wherein the at least one opening structure is at least partially stretchable or compressible when an external impact is incident upon the at least one opening structure.

3. The electronic device of claim 1, wherein the at least one opening structure comprises a first opening structure formed on at least one of a plurality of parallel edges of the first planar portion and the second planar portion that are parallel to a folding axis of the hinge structure.

4. The electronic device of claim 3, wherein the first opening structure is formed at points at which each of the plurality of parallel edges is divided into three parts.

5. The electronic device of claim 3, wherein the first opening structure is formed at points at which each of the plurality of parallel edges meets an imaginary extension line extending in a direction perpendicular to the folding axis from an inner end portion of the hinge structure.

6. The electronic device of claim 1, wherein the at least one opening structure comprises a second opening structure formed on at least one of a plurality of vertical edges of the first planar portion and the second planar portion that are perpendicular to a folding axis of the hinge structure.

7. The electronic device of claim 6, wherein the second opening structure is formed at points at which each of the plurality of vertical edges is divided into two parts.

8. The electronic device of claim 1, wherein the at least one opening structure extends inward from at least one of the plurality of outer edges with a constant width, or extends such that a width of the at least one opening structure decreases toward an inside of the electronic device.

9. The electronic device of claim 1, wherein the at least one opening structure is formed in a pattern in which hexagonal-shaped or diamond-shaped openings are repeatedly arranged.

10. The electronic device of claim 1, wherein the at least one opening structure is symmetrically formed with respect to a folding axis of the hinge structure.

11. The electronic device of claim 1, further comprising:
the adhesive member disposed along at least a portion of the plurality of outer edges of the first plate such that the first plate is attached to the housing; and
a second plate disposed between the first plate and the housing so as to avoid overlapping the adhesive member and configured to support the first plate.

12. The electronic device of claim 11, wherein the at least one opening structure is formed at a position so as to avoid overlapping the second plate.

13. The electronic device of claim 1, further comprising:
a printed circuit board (PCB) disposed on one side of the first plate,
wherein the at least one opening structure is formed at a position so as to avoid overlapping the PCB.

14. An electronic device comprising:
a flexible display including a first area, a second area, and a third area connecting the first area and the second area; and
a first plate disposed on a rear surface of the flexible display and configured to support the flexible display,
wherein the first plate includes a first planar portion facing the first area, a second planar portion facing the second area, and a bendable portion that connects the first planar portion and the second planar portion,
wherein the first plate further includes at least one opening structure formed at a designated position on at least one of a plurality of outer edges of the first planar portion and/or at least one of a plurality of outer edges of the second planar portion, the at least one opening structure configured to be at least partially stretchable or compressible when an external impact is incident upon the at least one opening structure,
wherein each of the at least one opening structure is formed on only one of the plurality of outer edges of the first planar portion and/or the second planar portion, and
wherein each of the at least one opening structure is formed in a pattern in which polygonal-shaped openings are repeatedly arranged and is configured to deform,
wherein the at least one opening structure extends inward from at least one of the plurality of outer edges,
wherein a length of the at least one opening structure extending inward from at least one of the plurality of outer edges is less than or equal to a width of an adhesive member that is disposed along at least a portion of the plurality of outer edges of the first plate to attach the first plate to a housing of the electronic device.

15. The electronic device of claim 14, wherein:
the at least one opening structure comprises a first opening structure formed on at least one of a plurality of parallel edges of the first planar portion and the second planar portion that are parallel to a folding axis, and
the first opening structure is formed at points at which each of the plurality of parallel edges is divided into three parts.

16. The electronic device of claim 14, wherein:
the at least one opening structure comprises a second opening structure formed on at least one of a plurality of vertical edges of the first planar portion and the second planar portion that are perpendicular to a folding axis, and
the second opening structure is formed at points at which each of the plurality of vertical edges is divided into two parts.

17. The electronic device of claim 14, further comprising:
the adhesive member disposed along at least a portion of plurality of outer edges of the first plate such that the first plate is attached to the housing; and
a second plate disposed between the first plate and the housing so as to avoid overlapping the adhesive member and configured to support the first plate,
wherein the at least one opening structure is formed at a position so as to avoid overlapping the second plate.

18. An electronic device comprising:
a housing including a first housing structure and a second housing structure that are rotatably connected to each other by a hinge structure;
a flexible display including a first area facing the first housing structure, a second area facing the second housing structure, and a third area connecting the first area and the second area; and
a first plate disposed between the housing and the flexible display and configured to support the flexible display,
wherein the first plate includes a first planar portion facing the first area, a second planar portion facing the second area, and a bendable portion that connects the first planar portion and the second planar portion,
wherein the first plate further includes at least one opening structure formed at a designated position on at least one of a plurality of outer sides of the first planar portion and/or at least one of a plurality of outer sides of the second planar portion, the at least one opening structure configured to be at least partially stretchable or compressible when an external impact is incident upon the at least one opening structure, wherein the at least one opening structure includes a first opening structure formed on at least one of a plurality of parallel sides of the first planar portion and the second planar portion that are parallel to a folding axis of the hinge structure, and a second opening structure formed on at least one of a plurality of vertical sides of the first planar portion and the second planar portion that are perpendicular to the folding axis, wherein the first opening structure is formed at points at which each of the plurality of parallel sides meets an imaginary extension line extending in a direction perpendicular to the folding axis from an inner end portion of the hinge structure, and wherein the second opening structure is formed at points at which each of the plurality of vertical sides is divided into two parts.

* * * * *